(12) United States Patent
Konashi et al.

(10) Patent No.: US 11,682,217 B2
(45) Date of Patent: Jun. 20, 2023

(54) SURVEILLANCE DEVICE, LEARNING DEVICE, SURVEILLANCE METHOD AND STORAGE MEDIUM

(71) Applicant: NEC Corporation, Tokyo (JP)

(72) Inventors: Takashi Konashi, Tokyo (JP); Satoru Yamano, Tokyo (JP); Shohei Mitani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 157 days.

(21) Appl. No.: 17/052,957

(22) PCT Filed: May 7, 2019

(86) PCT No.: PCT/JP2019/018202
§ 371 (c)(1),
(2) Date: Nov. 4, 2020

(87) PCT Pub. No.: WO2019/216295
PCT Pub. Date: Nov. 14, 2019

(65) Prior Publication Data
US 2021/0248385 A1    Aug. 12, 2021

(30) Foreign Application Priority Data

May 8, 2018    (WO) .................. PCT/JP2018/017735

(51) Int. Cl.
*G06V 20/56*    (2022.01)
*G06N 20/00*    (2019.01)

(52) U.S. Cl.
CPC ............. *G06V 20/56* (2022.01); *G06N 20/00* (2019.01)

(58) Field of Classification Search
CPC ........ G06V 20/56; G06N 20/00; G06N 7/005; G06N 5/022; B60R 16/02; G06F 11/07; G06F 11/30; H04L 12/28; H04L 12/40
See application file for complete search history.

(56) References Cited

U.S. PATENT DOCUMENTS 4,847,594 A * 7/1989 Stetter .................. G08B 21/182
73/25.03
11,200,435 B1 * 12/2021 Scanlon ............... G05D 1/0094
(Continued)

FOREIGN PATENT DOCUMENTS

JP    2002-189556 A    7/2002
JP    2004-502932 A    1/2004
(Continued)

OTHER PUBLICATIONS

JP Office Action for JP Application No. 2020-518290, dated May 17, 2022 with English Translation.
(Continued)

*Primary Examiner* — Lewis G West
(74) *Attorney, Agent, or Firm* — Sughrue Mion, PLLC

(57) ABSTRACT

A surveillance device according to the present invention includes: a memory; and at least one processor coupled to the memory. The processor performs operations. The operations includes: calculating, based on a value of a parameter that is contained in a received data frame and represents a state of an apparatus, a change in the state of the apparatus; and determining whether the change is included in an allowable range determined in accordance with the state of the apparatus before the change.

21 Claims, 15 Drawing Sheets

(56) References Cited

U.S. PATENT DOCUMENTS

| | | | |
|---|---|---|---|
| 2002/0040278 A1 | 4/2002 | Anuzis et al. | |
| 2003/0233366 A1* | 12/2003 | Kesselman | G06F 16/2358 |
| 2006/0293833 A1* | 12/2006 | Ushijima | G05B 23/0235 |
| | | | 340/425.5 |
| 2007/0127369 A1* | 6/2007 | Sebire | H04L 47/11 |
| | | | 370/329 |
| 2007/0129643 A1* | 6/2007 | Kwok | A61N 1/3627 |
| | | | 600/529 |
| 2009/0207017 A1* | 8/2009 | Erickson | H04Q 9/00 |
| | | | 707/999.1 |
| 2012/0081691 A1* | 4/2012 | Nagai | G01C 3/04 |
| | | | 356/4.01 |
| 2014/0035752 A1* | 2/2014 | Johnson | A01B 79/005 |
| | | | 340/601 |
| 2014/0266714 A1* | 9/2014 | Becker Antley | G06Q 10/107 |
| | | | 340/540 |
| 2014/0307096 A1* | 10/2014 | Park | G01S 15/02 |
| | | | 367/87 |
| 2014/0378779 A1* | 12/2014 | Freeman | A61B 5/02055 |
| | | | 600/301 |
| 2015/0084784 A1* | 3/2015 | Suta | G08C 17/02 |
| | | | 340/870.01 |
| 2016/0004226 A1* | 1/2016 | Tanaka | G05B 11/42 |
| | | | 700/80 |
| 2016/0170814 A1* | 6/2016 | Li | G06F 9/542 |
| | | | 719/318 |
| 2017/0193796 A1* | 7/2017 | Sekikawa | B23Q 1/0045 |
| 2017/0278323 A1 | 9/2017 | Gupta et al. | |
| 2018/0294991 A1 | 10/2018 | Tsurumi et al. | |
| 2019/0099886 A1* | 4/2019 | Chattopadhyay | G05B 23/024 |
| 2020/0402058 A1* | 12/2020 | Zhou | G06F 9/542 |
| 2021/0014309 A1* | 1/2021 | Kim | G07C 5/02 |
| 2021/0024036 A1* | 1/2021 | Diehl | B60R 25/102 |
| 2021/0233786 A1* | 7/2021 | Lim | H01L 21/68 |
| 2022/0081132 A1* | 3/2022 | Mukae | B64G 1/242 |
| 2022/0172295 A1* | 6/2022 | Grandy | G06Q 40/08 |
| 2022/0318921 A1* | 10/2022 | Tucker | G06Q 40/08 |

FOREIGN PATENT DOCUMENTS

| | | |
|---|---|---|
| JP | 2011-075523 A | 4/2011 |
| JP | 2017-112594 A | 6/2017 |
| WO | 2016/143072 A1 | 9/2016 |
| WO | 2017/119027 A1 | 7/2017 |

OTHER PUBLICATIONS

International Search Report for PCT Application No. PCT/JP2019/018202, dated Aug. 6, 2019.

English translation of Written opinion for PCT Application No. PCT/JP2019/018202, dated Aug. 6, 2019.

* cited by examiner

SURVEILLANCE DEVICE, LEARNING DEVICE, SURVEILLANCE METHOD AND STORAGE MEDIUM

This application is a National Stage Entry of PCT/JP2019/018202 filed on May 7, 2019, which claims priority from International Patent Application PCT/JP2018/017735 filed on May 8, 2018, the contents of all of which are incorporated herein by reference, in their entirety.

TECHNICAL FIELD

The present invention relates to a surveillance technique, and more particularly, to a technique for surveillance of abnormal data.

BACKGROUND ART

In recent years, a plurality of electronic control units (ECUs) connected by a network is mounted on an automobile. A network for connecting the ECUs mounted on the automobile is also called an on-board network. To the on-board network, the ECUs transmit, for example, various types of data as data frames in a format determined in accordance with a communication protocol. As the communication protocol for the on-board network, a protocol such as a controller area network (CAN) is used. The ECUs transmit, to the on-board network, data representing a state of the automobile, for example, data acquired by a sensor or the like mounted on the automobile. Data indicating the state of the automobile, such as data acquired by a sensor mounted on the automobile, may be used to control the automobile. Thus, there is a demand for detecting, from data frames transmitted to the on-board network, anomaly data frames such as a data frame for purpose of attacking and an abnormal data frame due to an ECU failure, a sensor failure, or the like.

Patent literature (PTL) 1 discloses an example of an impropriety detection method for detecting an occurrence of an improper state in an on-board network system including a plurality of ECUs.

PTL 2 discloses a security device that transmits a determination request to an external device in a case where conditions for determining whether a frame transmitted to a bus of an onboard network is an attack frame are satisfied.

CITATION LIST

Patent Literature

[PTL 1] WO 2017/119027 A
[PTL 2] JP 2017-112594 A

SUMMARY OF INVENTION

Technical Problem

In the impropriety detection method disclosed in PTL 1, in a case where a plurality of types of data contained in a frame lacks consistency, an impropriety is detected. The consistency between the plurality of types of data is determined by using a fixed threshold value for a value calculated from a value indicated by the data, such as an amount of change in value indicated by the data. According to the technique of PTL 1, even in a case where data in an anomaly frame has a value that cannot be actually detected, it is not possible to detect the anomaly frame as long as consistency of a plurality of types of data contained in the anomaly frame is ensured.

In the security device of PTL 2, in a case where an absolute value of an amount of change in values indicated by data in a data field of a frame exceeds a threshold value set as an upper limit of the absolute value, that frame is determined to be a frame suspect of being transmitted in an anomaly manner. According to the technique of PTL 2, even in a case where the amount of change in values of data contained in a frame that has been transmitted in an anomaly manner is abnormal depending on a state of a vehicle, it is not possible to detect that frame if the absolute value of the amount of change is smaller than the upper limit value set in advance.

It is therefore an object of the present invention to provide a surveillance device and the like capable of improving an accuracy of detecting an anomaly frame from frames containing data representing a state of an apparatus flowing through a network.

Solution to Problem

A surveillance device according to an aspect of the present invention includes a memory; and at least one processor coupled to the memory. The processor performs operations. The operations includes: calculating, based on a value of a parameter that is contained in a received data frame and represents a state of an apparatus, a change in the state of the apparatus, and determining whether the change is included in an allowable range determined in accordance with the state of the apparatus before the change.

A learning device according to an aspect of the present invention includes a memory; and at least one processor coupled to the memory. The processor performs operations. The operations includes: calculating, based on a value of a parameter that is contained in a received data frame and represents a state of an apparatus, a change in the state of the apparatus, generating a distribution of the change in accordance with the state of the apparatus before the change, and setting an allowable range of the change based on the generated distribution.

A surveillance method according to an aspect of the present invention includes calculating, based on a value of a parameter that is contained in a received data frame and represents a state of an apparatus, a change in the state of the apparatus, and determining whether the change is included in an allowable range determined in accordance with the state of the apparatus before the change.

A learning method according to an aspect of the present invention includes calculating, based on a value of a parameter that are contained in a received data frame and represent a state of an apparatus, a change in the state of the apparatus, generating a distribution of the change in accordance with the state of the apparatus before the change, and setting an allowable range of the change based on the generated distribution.

A non-transitory computer-readable storage medium according to an aspect of the present invention embodies a program that causes a computer to perform a method. The method includes: calculating, based on a value of a parameter that is contained in a received data frame and represents a state of an apparatus, a change in the state of the apparatus, and determining whether the change is included in an allowable range determined in accordance with the state of the apparatus before the change.

A non-transitory computer-readable storage medium according to an aspect of the present invention embodies a program that causes a computer to perform a method. The method includes: calculating, based on a value of a parameter that is contained in a received data frame and represents a state of an apparatus, a change in the state of the apparatus, generating a distribution of the change in accordance with the state of the apparatus before the change, and setting an allowable range of the change based on the generated distribution.

Advantageous Effects of Invention

The present invention has an effect of improving the accuracy of detecting an anomaly frame from frames containing data representing the state of the apparatus flowing through a network.

EXAMPLE EMBODIMENT

Example embodiments of the present invention will be described below in detail with reference to the drawings.

First Example Embodiment

<<Configuration>>

Figure 1:
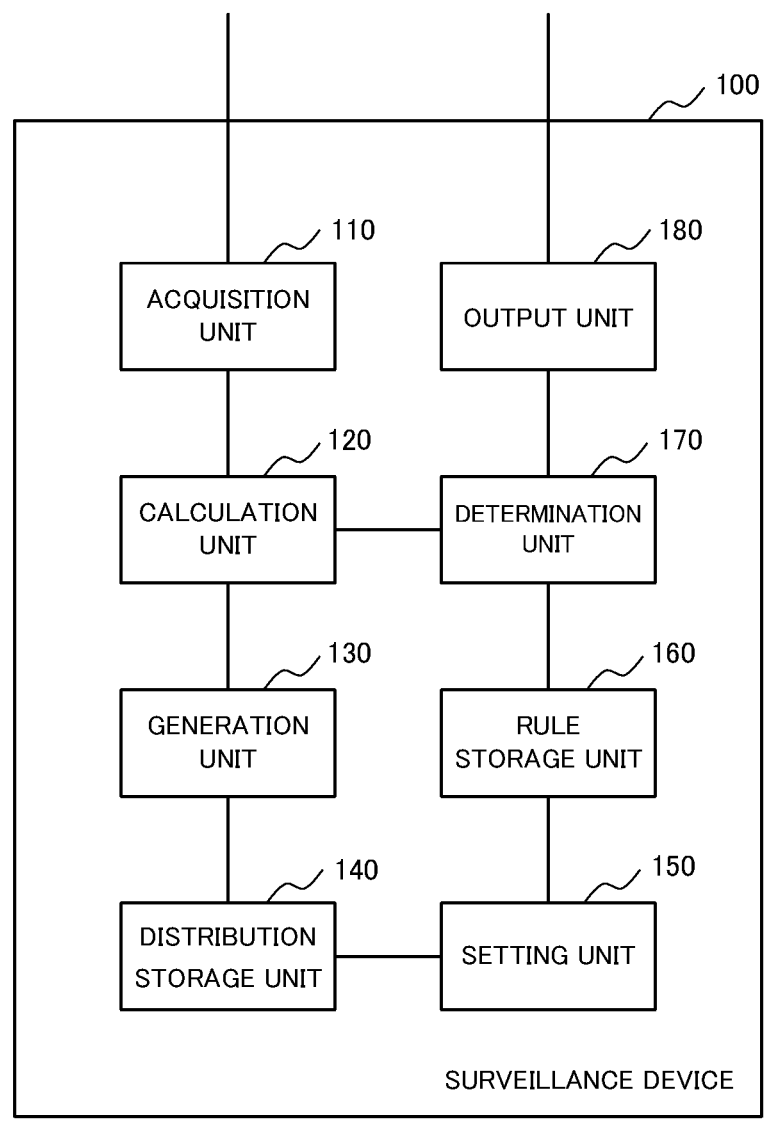
FIG. 1 is a block diagram illustrating an example of a configuration of a surveillance device according to first and fourth example embodiments of the present invention.

FIG. 1 is a block diagram illustrating an example of a configuration of a surveillance device according to a first example embodiment of the present invention. A surveillance device 100 of the present example embodiment is connected to, for example, an on-board network mounted on an automobile. The surveillance device 100 may be communicatively connected to a call center terminal or the like via a wireless communication line, for example. Hereinafter, automobiles are also referred to as vehicles.

Figure 2:
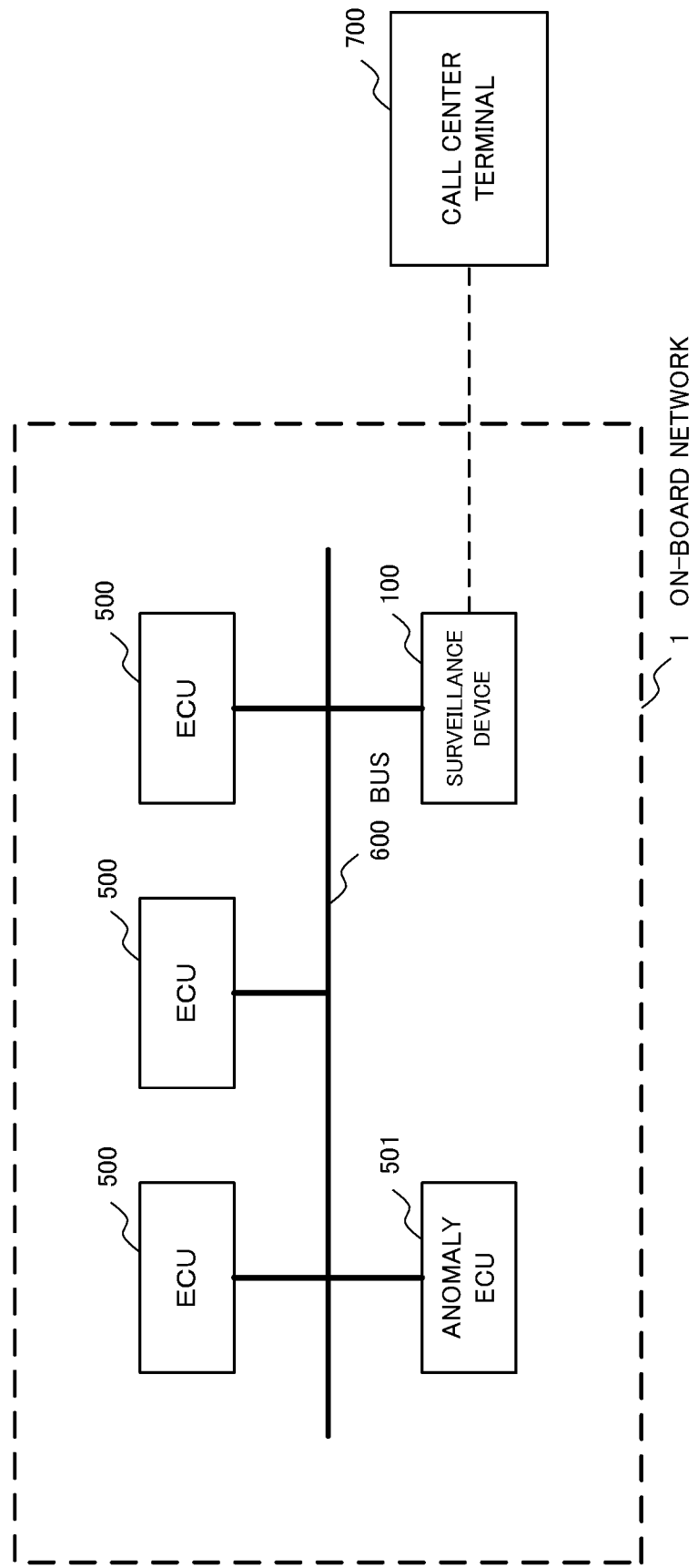
FIG. 2 is a block diagram illustrating an example of a configuration of an on-board network including the surveillance device according to the first and fourth example embodiments of the present invention.

FIG. 2 is a block diagram illustrating an example of a configuration of an on-board network including the surveillance device 100. In the example illustrated in FIG. 2, an on-board network 1 includes the surveillance device 100 and a plurality of ECUs 500 that are communicatively connected to each other via a bus 600. A protocol used in the on-board network 1 may be, for example, a CAN. Other protocols may be used in the on-board network 1. The surveillance device 100 can communicate with a call center terminal 700 via a wireless communication line such as a mobile phone communication line.

The ECUs 500 send, to the bus 600, data frames representing messages including, as values of parameters, data values or the like measured by sensors connected to the ECUs 500, for example. In other words, data frames (i.e., specifically, values of parameters contained in the data frames) sent from the ECUs 500 to the bus 600 represent at least a part of a state of a vehicle. The ECUs 500 assign identifications (IDs) to data frames to be sent. The ECUs 500 acquire, from among data frames that are sent to the bus 600 and flowing through the bus 600, data frames assigned with specific IDs determined in advance one for each ECU 500, for example.

For example, an ECU 500 connected to an engine sends, to the bus 600, a data frame containing a rotation speed of an engine as a parameter value. An ECU 500 connected to a steering wheel may send a data frame containing a steering angle of the steering wheel as a parameter value. An ECU 500 connected to an air conditioner may send a data frame containing, for example, a room temperature and a set temperature of the air conditioner as parameter values. An ECU 500 connected to a transmission may send a data frame containing a drive mode or a gear position as a parameter value. The data frame sent by the ECU 500 connected to the transmission may further include a rotation speed of a shaft, a rotation speed of a wheel, a speed of the vehicle, and the like as parameter values. The parameter values may include, for example, a throttle opening, an engine intake pressure, an intake amount, a fuel temperature, an intake temperature, an exhaust gas temperature, a concentration of $CO_2$, $CO$, $NO_x$, or the like contained in exhaust gas, and an atmospheric pressure. The parameter values may include, for example, a brake opening, a yaw rate, an engine coolant temperature, a fuel level according to a fuel gauge, an open/closed state of a door, a lighting state of a light, and a lighting state of a blinker. The parameter values may include other values that can be measured by a sensor attached to the automobile. The parameter values may include other values that can be acquired from the automobile. The parameters may include a parameter synthesized from a plurality of parameters (hereinafter referred to as a synthesis parameter). The synthesis parameter may have a value calculated from values of the plurality of parameters used for synthesis according to, for example, a method determined in advance. The parameter values are not limited to the above examples.

A data frame does not necessarily contain values of all types of parameters. In the following description, a data frame contains values of one or more types of parameters. A data frame may not contain any parameter value. The surveillance device 100 may determine whether an acquired data frame contains a parameter value. In a case where an acquired data frame does not contain any parameter value, the surveillance device 100 may not perform any further processing on that data frame.

In the present example embodiment, a state of the vehicle is represented by a combination of parameter values. As described above, the ECUs 500 send data frames containing, for example, a value measured by a sensor as a parameter value. In the present example embodiment, when a data frame containing a parameter value is acquired by the surveillance device 100, it is assumed that the state of the vehicle has changed from a state before the change to a state indicated by the acquired data frame. The state indicated by the data frame is a state represented by the parameter value contained in the data frame. A Value of parameter that is not contained in the acquired data frame is assumed to have remained unchanged. The state before the change is, for example, the state of the vehicle represented by the last but one data frame acquired.

In the example illustrated in FIG. 2, the bus 600 is further connected with an anomaly ECU 501. The anomaly ECU 501 is an ECU that transmits an anomaly data frame to the bus 600. Hereinafter, a data frame is also referred to simply as a "frame". The anomaly ECU 501 can be, for example, an ECU hacked by an external attacker and controlled by the attacker. The anomaly ECU 501 can be, for example, a faulty ECU. The anomaly data frame sent to the bus 600 by the anomaly ECU 501 is a data frame that does not represent the state of the vehicle on which the anomaly ECU 501 is mounted, but represents a state different from the state of the vehicle. The anomaly data frame is, for example, a data frame intended to attack the vehicle. The data frame intended to attack the vehicle is, for example, a data frame intended to cause an ECU 500 that has acquired the anomaly data frame to malfunction, resulting in malfunction of the automobile on which the malfunctioning ECU 500 is mounted. The anomaly data frame may be, for example, a data frame in which a parameter value has been set to an anomaly value due to a sensor failure or an ECU failure. In a case where a frame is acquired in which an anomaly value that does not represent the state of the vehicle has been set as a parameter value, an ECU 500 may malfunction, which may cause the vehicle to malfunction.

The surveillance device 100 acquires a data frame sent to the bus 600. The surveillance device 100 may acquire all the data frames sent to the bus 600 regardless of the IDs assigned to the data frames. The surveillance device 100 performs two types of operations using the acquired data frame. In the following description, phases of those operations performed by the surveillance device 100 will be referred to as a learning phase and a detection phase. In the learning phase, the surveillance device 100 uses the acquired data frame to learn a criterion for determining whether the data frame is an anomaly data frame. In the detection phase, the surveillance device 100 determines whether the acquired data frame is an anomaly data frame. In the description of the present example embodiment, in a case where the acquired data frame is an anomaly data frame, the surveillance device 100 sends information of the data frame determined to be an anomaly data frame to, for example, the call center terminal 700. The surveillance device 100 may send the information of the data frame determined to be an anomaly data frame to another device (for example, one of the ECUs 500). The surveillance device 100 may send the information of the data frame determined to be an anomaly data frame to an ECU 500 configured to acquire data frames determined to be anomaly data frames. The surveillance device 100 will be described in detail below.

In the configuration illustrated in FIG. 1, the surveillance device 100 of the present example embodiment includes an acquisition unit 110, a calculation unit 120, a generation unit 130, a distribution storage unit 140, a setting unit 150, a rule storage unit 160, a determination unit 170, and an output unit 180.

The acquisition unit 110 acquires (in other words, receives) a data frame from the on-board network 1. Specifically, the acquisition unit 110 acquires a data frame sent to the bus 600. The acquisition unit 110 sends the acquired data frame to the calculation unit 120. The acquisition unit 110 may acquire data frames in a similar manner in both the learning phase and the detection phase.

The calculation unit 120 receives a data frame from the acquisition unit 110, and extracts a parameter value from the received data frame. For example, in a case where a structure of a data frame is determined in accordance with an ID assigned to the data frame, the calculation unit 120 first identifies the ID assigned to the data frame. The calculation unit 120 reads the parameter value from a portion representing the parameter value in the data frame on the basis of the structure of the data frame to which the identified ID is assigned. In a case where the data frame contains values of a plurality of types of parameters, the calculation unit 120 may read the values of all the parameters contained in the data frame. The calculation unit 120 may read only a value of a parameter determined in advance among the values of the parameters contained in the data frame. The calculation unit 120 may read a parameter value from a data frame in a similar manner in both the learning phase and the detection phase.

The calculation unit 120 stores the state of the vehicle before acquisition of the data frame. The state of the vehicle is represented by, for example, a combination of parameter values. The calculation unit 120 may store the state of the vehicle in a similar manner in both the learning phase and the detection phase.

In a case where a value of the same parameter as the parameter a value of which has been read from the acquired data frame is not stored as the state of the vehicle, the calculation unit 120 sets the parameter value read from the acquired data frame as a parameter value representing the state of the vehicle. Specifically, the calculation unit 120 determines whether a parameter a value of which has been read from the acquired data frame include a parameter a value of which is not stored as the state of the vehicle. In a case where the a parameter a value of which has been read from the acquired data frame include a parameter a value of which is not stored as the state of the vehicle, the calculation unit 120 updates the state of the vehicle in accordance with the parameter values read from the acquired data frame. That is, the calculation unit 120 sets the parameter values read from the acquired data frame as parameter values representing the state of the vehicle. In the following description, updating the state of the vehicle means setting parameter values read from an acquired data frame as parameter values representing the state of the vehicle. In a case where the parameter a value of which has been read from the acquired data frame include a parameter a value of which is not stored as the state of the vehicle in both the learning phase and the detection phase, the calculation unit 120 may update the state of the vehicle in a similar manner.

In a case where all the parameter a value of which has been read from the acquired data frame have had their values stored as the state of the vehicle, the calculation unit 120 calculates a change in the state of the vehicle. Specifically, the calculation unit 120 calculates, as the change in the state of the vehicle, changes from the values stored as the state of the vehicle to the parameter values read from the acquired data frame. In this case, the state of the vehicle may be represented by a vector containing, as elements, values representing changes in values of the individual parameters. The calculation unit 120 may calculate a change in the state of the vehicle in a similar manner in both the learning phase and the detection phase.

In the learning phase, the calculation unit 120 sends to the generation unit 130 a previous state, which is a state of the vehicle before it has changed into the state of the vehicle indicated by a data frame (specifically, information representing the previous state), and the calculated change in the state of the vehicle (specifically, information representing the calculated amount of change in the state of the vehicle). The amount of change in the state of the vehicle may be an amount of change in the amount of change in the state of the vehicle. Then, the calculation unit 120 updates the previous state in accordance with the parameter values contained in the acquired data frame. Specifically, among the values of the parameters representing the previous state, the calculation unit 120 replaces a value of a parameter a value of which is contained in the acquired data frame with the value of the parameter contained in the acquired data frame.

In the detection phase, the calculation unit 120 sends, to the determination unit 170, the previous state and the calculated change in the state of the vehicle (specifically, information representing the calculated amount of change in the state of the vehicle). Then, the calculation unit 120 updates the previous state in accordance with the parameter values contained in the acquired data frame.

The distribution storage unit 140 stores a distribution of change in the state of the vehicle (hereinafter also referred to as the distribution of amount of change) in accordance with a state of the vehicle before it has changed into the state of the vehicle indicated by a data frame (hereinafter also referred to as the previous state). For example, for each state of the vehicle before it has changed into the state of the vehicle indicated by a data frame (i.e., the previous state), the distribution storage unit 140 may store information representing a distribution of change in the state of the vehicle in a case where the previous state is included in a range. For example, for each range of previous state determined in advance, the distribution storage unit 140 may store information representing a distribution of change in the state of the vehicle in a case where the previous state is included in the range. "Storing a distribution of change in the state of the vehicle" means storing information representing a distribution of amount of change in the state of the vehicle. For example, the distribution storage unit 140 may store information representing a distribution of amount of change in the state of the vehicle associated with information representing a range of state of the vehicle before the change. The information representing a range of state of the vehicle before the change is, for example, in a format determined in advance that has been set so that a distinction can be made between different ranges of the state of the vehicle and a determination can be made whether a state of the vehicle represented by parameter values is included in a range of state of the vehicle.

A range of state of the vehicle (for example, a range of state of the vehicle before it has changed into the state of the vehicle indicated by an acquired data frame) may be represented by, for example, a range of values determined for each parameter. For example, in a case where the state of the vehicle is represented by parameter A and parameter B, a range of state of the vehicle may be represented by, for example, a section of length a obtained by dividing a range of parameter A, and a section of length b obtained by dividing a range of parameter B. For example, in a case where i is a number that identifies a section obtained by dividing the range of parameter A, and j is a number that identifies a section obtained by dividing the range of parameter B, a range of state of the vehicle can be expressed by a combination of i and j. In this case, information representing the range of state of the vehicle may be a combination of i and j. In this case, the range of state of the vehicle is represented by a rectangle. In this case, for each combination of i and j, the distribution storage unit 140 may store a distribution of change in the state of the vehicle from the previous state in which the value of parameter A is included in a section represented by i and the value of parameter B is included in a section represented by j. For combinations of i and j that are different from each other, the distribution storage unit 140 stores distributions of change in the state of the vehicle that are different from each other. In a case where the number of parameters is three, a range of state of the vehicle may be represented by a rectangular parallelepiped. In a case where the number of parameters is greater than three, a range of state of the vehicle may be represented by a super rectangular parallelepiped. Sections into which a range of a parameter is divided may not be constant in length. A section may be set to a value obtained by performing a transformation on at least some of parameter values. The transformation may be a logarithmic transformation, an exponential transformation, or other types of processing. In a case where the sections described above for all the parameters are equal to a minimum difference in values when parameter values are represented as data, a range of state of the vehicle is equivalent to one state of the vehicle.

The distribution storage unit 140 may store, as a distribution of change in the state of the vehicle, a calculated change in the state of the vehicle (for example, an amount of change in value of each parameter representing the state of the vehicle) as it is, for example, in a form of a vector. The distribution storage unit 140 may store, as a distribution of change in the state of the vehicle, a value of frequency for each range obtained by dividing a range of the amount of change in the state of the vehicle (hereinafter also referred to as a change unit). The range (i.e., the change unit) in this case may be determined in advance. A magnitude of the change unit may be different from a magnitude of the range in the previous state described above. The change unit may be, for example, a super rectangular parallelepiped. The distribution storage unit 140 may store a distribution of change in the state of the vehicle in another form.

The distribution storage unit 140 may store a distribution of change in the state of the vehicle for a combination of all the parameters representing the state of the vehicle. Specifically, the distribution storage unit 140 may store a distribution of change in the state of the vehicle in a feature space obtained from the combination of all the parameters representing the state of the vehicle. In this case, for example, in a case of two parameters, speed and steering angle, the feature space is a two-dimensional space with speed on a vertical axis and steering angle on a horizontal axis. The number of dimensions and the axes settings are not limited to the above examples. The distribution storage unit 140 may store a distribution of change in the state of the vehicle for a combination of predetermined parameters selected from the parameters representing the state of the vehicle. Specifically, the distribution storage unit 140 may store a distribution of change in the state of the vehicle in a feature space obtained from a combination of parameters selected from all the parameters representing the state of the vehicle. The distribution storage unit 140 may store a distribution of change in the state of the vehicle in each of a plurality of feature spaces obtained from a plurality of different combinations of parameters selected from the parameters representing the state of the vehicle. For example, in a case where the parameters are speed, acceleration and steering angle, the plurality of feature spaces may be a space obtained from speed and steering angle and a space obtained from speed and acceleration. The distribution storage unit 140 may store a distribution of change in the state of the vehicle in each of all the feature spaces obtained from combinations of parameters that can be selected from the parameters representing the state of the vehicle.

In other words, the distribution storage unit 140 stores a distribution of change in the state of the vehicle associated with information representing the previous state in a feature space obtained from one or more combinations of parameters that can be selected from all the parameters representing the state of the vehicle. The previous state associated with the distribution of change in the state of the vehicle may not be a previous state represented by all the parameters. The previous state whose information is associated with the distribution of change in the state of the vehicle may be the previous state of parameters selected as parameters representing a distribution of change in the state of the vehicle. Information representing the previous state of parameters selected as parameters representing a distribution of change in the state of the vehicle is information identifying the state of the parameters selected as parameters representing a distribution of change in the state of the vehicle, in the state of the vehicle before the state of the vehicle represented by the latest data frame. This state of the parameters is, for example, values of the parameters or ranges of values of the parameters.

In the learning phase, the generation unit 130 first identifies a distribution of amount of change in accordance with a state of the vehicle before it has changed into the state of the vehicle indicated by a data frame (i.e., the previous state described above). More specifically, the generation unit 130 identifies, from a distribution of amount of change stored in the distribution storage unit 140, a distribution of amount of change in a feature space obtained from a combination of parameters including a parameter a value of which is contained in the acquired data frame from a state before the state of the vehicle represented by the acquired data frame.

Then, the generation unit 130 updates the identified distribution of amount of change in accordance with the amount of change from the state before the state of the vehicle represented by the acquired data frame. Specifically, for example, in a case where the distribution of amount of change is represented by a set of amounts of change, the generation unit 130 may add the amount of change from the state before the state of the vehicle represented by the acquired data frame to the set of amounts of change representing the distribution of amount of change. In a case where the distribution of amount of change is represented by a frequency of each change unit described above, the generation unit 130 may identify a change unit containing the amount of change from the state before the state of the vehicle represented by the acquired data frame, and add 1 to the frequency of the identified change unit. In a case where a plurality of distributions has been identified, the generation unit 130 updates all the identified distributions.

In the detection phase, the generation unit 130 does not need to operate.

In the learning phase, the setting unit 150 sets an allowable range of amount of change for each of the distributions of amount of change stored in the distribution storage unit 140. Various methods can be used to set an allowable range of amount of change. For example, the setting unit 150 may set, as an allowable range, a range included between a maximum and a minimum of the amount of change in each parameter in each distribution. For example, the setting unit 150 may assume that a distribution of amount of change in each parameter is a normal distribution, and set, as an allowable range, a range in which a difference from an average value of the amount of change is within a constant multiple of a standard deviation for each parameter in each distribution. In these cases, for example, on the assumption that each distribution is a uniform distribution, an allowable range in a given distribution may be represented by a combination of a minimum value and a maximum value of each parameter in that distribution. The setting unit 150 may apply a Gaussian mixture model to each distribution, identify a range having a magnitude that satisfies a predetermined condition in a distribution approximated by a mixed Gaussian distribution, and set the identified range as an allowable range. In a case where an allowable range cannot be represented by a combination of a minimum and a maximum for each parameter, the setting unit 150 may approximate the allowable range by, for example, a combination of super rectangular parallelepipeds. In this case, the setting unit 150 may use, as information for identifying the allowable range, information that can identify all the super rectangular parallelepipeds included in, for example, the combination of super rectangular parallelepipeds that approximate the allowable range. In a case where the number of parameters is two, the setting unit 150 may use a rectangle instead of a super rectangular parallelepiped. In a case where the number of parameters is three, the setting unit 150 may use a rectangular parallelepiped instead of a super rectangular parallelepiped. Information representing an allowable range is not limited to the above examples.

The setting unit 150 stores information representing the set allowable range for each distribution of amount of change in the rule storage unit 160. As described above, a distribution of amount of change is generated for each feature space obtained from a combination of parameters. A distribution of amount of change stored in the distribution storage unit 140 is associated with information representing the previous state. The setting unit 150 may store, in the rule storage unit 160, information representing an allowable range associated with information identifying a feature space obtained from a combination of parameters and information representing the previous state. Information identifying a feature space may be information identifying a combination of parameters from which that feature space is obtained.

As described above, information representing the previous state associated with a distribution of amount of change may be information representing the previous state of a combination of parameters for which the distribution of amount of change has been generated. In this case, a value or a range of values of a selected parameter can be identified by information representing the previous state. Thus, a selected parameter can be identified by the information representing the previous state. A selected parameter is a parameter for which a range of values is indicated by an allowable range. Thus, a selected parameter can be identified by an allowable range. Identifying a selected parameter makes it possible to identify a feature space obtained from the selected parameter. Thus, information identifying a feature space (for example, information identifying a selected parameter) may, as separate information from a set allowable range, not be associated with the set allowable range. In this case, the setting unit 150 may store, in the rule storage unit 160, information representing the set allowable range, the information being associated with information representing the previous state.

In the detection phase, the setting unit 150 does not need to operate.

The rule storage unit 160 stores information representing a set allowable range for each distribution of amount of change. Specifically, the rule storage unit 160 stores information representing an allowable range for each distribution of amount of change associated with information representing the previous state. In a case where a selected parameter cannot be identified by information representing the previous state, the rule storage unit 160 may store information representing an allowable range associated with information identifying a feature space (for example, information identifying a combination of parameters) and the information representing the previous state.

The determination unit 170 does not need to operate in the learning phase.

In the detection phase, the determination unit 170 receives, from the calculation unit 120, the previous state (specifically, information representing the previous state) and a calculated change in the state of the vehicle (specifically, information representing a calculated amount of change in the state of the vehicle). The determination unit 170 identifies an allowable range determined in a feature space obtained from a combination of parameters that includes a parameter whose amount of change in value is contained in the received information representing the amount of change in the state of the vehicle. In a case where a plurality of feature spaces is obtained and a plurality of allowable ranges can be identified in allowable ranges stored in the rule storage unit 160, the determination unit 170 may identify all of the plurality of allowable ranges.

The determination unit 170 determines whether the identified allowable range includes the amount of change represented by the received information representing the amount of change in the state of the vehicle. In a case where a plurality of allowable ranges has been identified, the determination unit 170 determines whether each of the identified allowable ranges includes the amount of change represented by the received information representing the amount of change in the state of the vehicle. In the present example embodiment, the determination unit 170 may assume that an amount of change in value of a parameter whose amount of change in value is not included in information representing an amount of change in the state of the vehicle is 0.

In a case where at least one of the allowable ranges does not include the amount of change represented by the received information representing the amount of change in the state of the vehicle, the determination unit 170 may determine that the data frame acquired by the acquisition unit 110 is an anomaly data frame. The determination unit 170 sends a result of the determination to the output unit 180. The result of the determination may be information indicating that the data frame has been determined to be anomaly or information indicating that the data frame has been determined not to be anomaly, which are determined in advance. The information indicating that the data frame has been determined to be anomaly indicates that at least one of the allowable ranges does not include the amount of change represented by the information representing the amount of change in the state of the vehicle. The information indicating that the data frame has been determined not to be anomaly indicates that the amount of change represented by the information representing the amount of change in the state of the vehicle is included in all the identified allowable ranges.

The output unit 180 does not need to operate in the learning phase.

In the detection phase, the output unit 180 receives a result of the determination made by the determination unit 170. That is, the output unit 180 receives information representing whether at least one of the identified allowable ranges does not include the amount of change represented by the information representing the amount of change in the state of the vehicle, or whether all the identified allowable ranges include the amount of change. In other words, the output unit 180 receives, from the determination unit 170, information representing whether the data frame acquired by the acquisition unit 110 has been determined to be an anomaly data frame.

In a case where the determination unit 170 determines that the data frame acquired by the acquisition unit 110 is an anomaly data frame, the output unit 180 notifies a notification destination (for example, the call center terminal 700) of the information of the frame. In this case, the output unit 180 may transmit, as a notification, information identifying the data frame determined to be an anomaly data frame to the notification destination. The output unit 180 may transmit, as a notification, information identifying a parameter contained in the data frame determined to be an anomaly data frame to the notification destination. The output unit 180 may transmit, as a notification, information identifying a parameter contained in the data frame determined to be an anomaly data frame and a value of the parameter to the notification destination.

In a case where the determination unit 170 determines that the data frame acquired by the acquisition unit 110 is not an anomaly data frame, the output unit 180 does not need to notify the notification destination such as the call center terminal 700.

<<Operation>>

Next, an operation of the surveillance device 100 of the present example embodiment will be described in detail with reference to the drawings.

Figure 3:
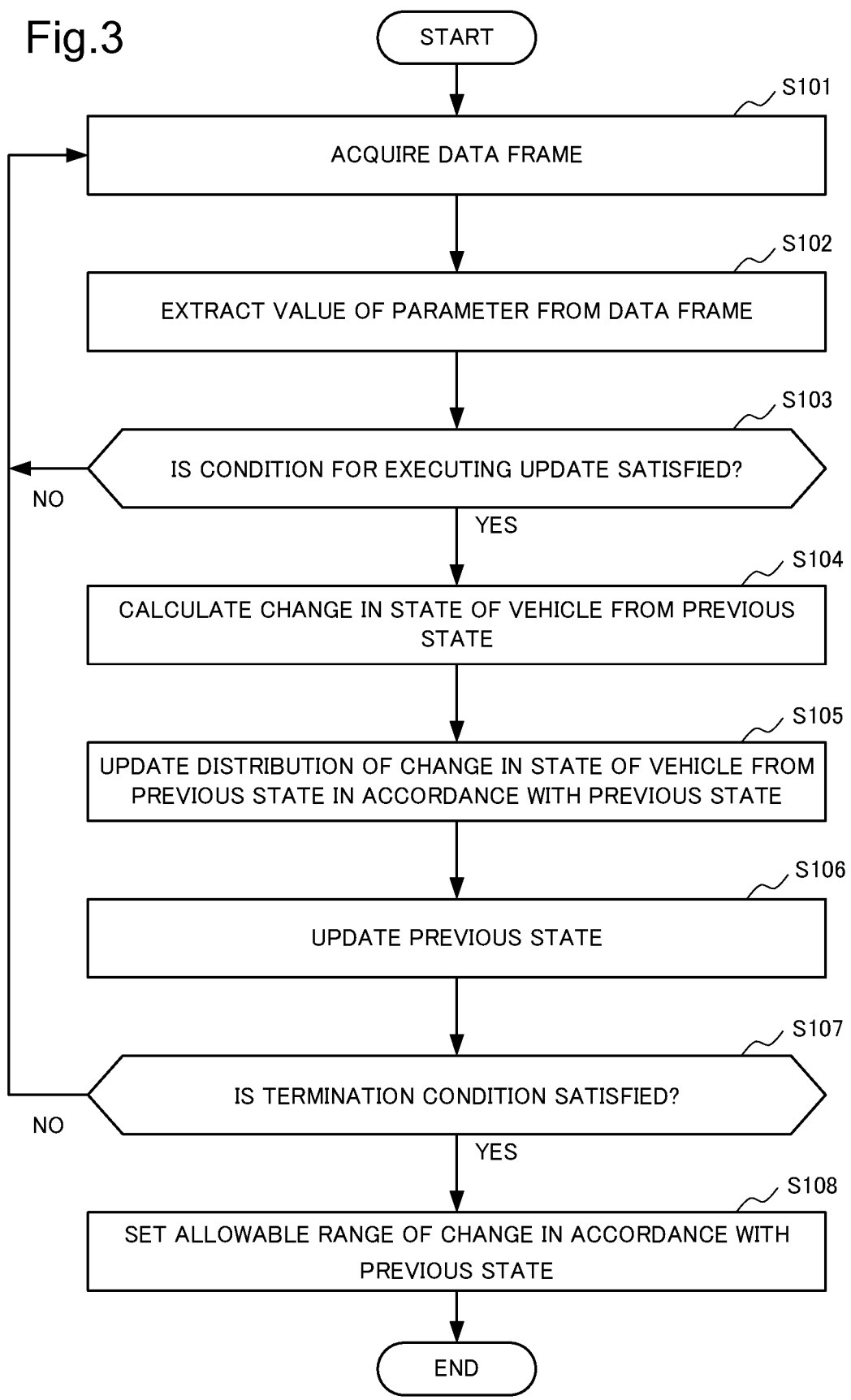
FIG. 3 is a flowchart illustrating an operation in a learning phase of the surveillance device according to the first and fourth example embodiments of the present invention.

FIG. 3 is a flowchart illustrating an operation in the learning phase of the surveillance device 100 of the present example embodiment. The learning phase is based on an assumption that it has been confirmed that no anomaly data frame exists. The surveillance device 100 starts the operation in the learning phase, for example, by an instruction from an operator.

Referring to FIG. 3, first, the acquisition unit 110 acquires a data frame flowing through the bus 600 (step S101).

Next, the calculation unit 120 extracts a value of a parameter from the acquired data frame (step S102). The calculation unit 120 determines whether a condition for executing the update is satisfied, and if the condition for executing the update is not satisfied as a result of the determination (NO in step S103), the operation of the surveillance device 100 returns to step S101.

The condition for executing the update may be, for example, that the extracted data frame contains a parameter a value of which is stored as the state of the vehicle. For example, the calculation unit 120 may determine that the condition for executing the update is satisfied in a case where the extracted data frame contains a parameter a value of which is stored as the state of the vehicle. For example, the calculation unit 120 may determine that the condition for executing the update is satisfied in a case where the extracted data frame does not contain any parameter a value of which is stored as the state of the vehicle. The condition for executing the update are not limited to the above examples.

If the condition for executing the update is satisfied (YES in step S103), the calculation unit 120 calculates a change in the state of the vehicle from the previous state (step S104). As described above, the calculation unit 120 may assume that, among the parameters representing the state of the vehicle, a parameter a value of which is not contained in the acquired data frame has remained unchanged in value. The calculation unit 120 may calculate a change from the previous state in value of a parameter a value of which is contained in the acquired data frame. In the learning phase, the calculation unit 120 sends, to the generation unit 130, information representing the previous state and the calculated change in the state of the vehicle.

Next, the generation unit 130 updates the distribution of change in the state of the vehicle from the previous state in accordance with the previous state (step S105). In accordance with the calculated change, the generation unit 130 updates, among distributions of change in value for a plurality of combinations of parameters representing the state of the vehicle, a distribution of change in value in accordance with the previous state in a feature space represented by a combination including a parameter a value of which is contained in the data frame.

Next, the calculation unit 120 updates the previous state in accordance with the value of the parameter extracted from the acquired data frame (step S106). The operation of step S106 may be performed before the operation of step S105.

If a termination condition is not satisfied (NO in step S107), the surveillance device 100 repeats the operation from step S101. The generation unit 130 repeatedly updates the distribution of change in the state of the vehicle to generate a distribution of change in the state of the vehicle.

The termination condition may be determined in advance. The termination condition may be, for example, that the number of acquired data frames has reached a predetermined number. The termination condition may be, for example, that the number of updates of each of all the distributions of change has reached a predetermined number. The termination condition may be, for example, that an operator has given a termination instruction. The termination condition is not limited to the above examples.

If the termination condition is satisfied (YES in step S107), the setting unit 150 sets an allowable range of change in accordance with the previous state in each of a plurality of feature spaces obtained from the above-described plurality of combinations of parameters. The setting unit 150 stores, in the rule storage unit 160, the set allowable range of change in accordance with the previous state.

Next, an operation in the detection phase of the surveillance device 100 of the present example embodiment will be described.

Figure 4:
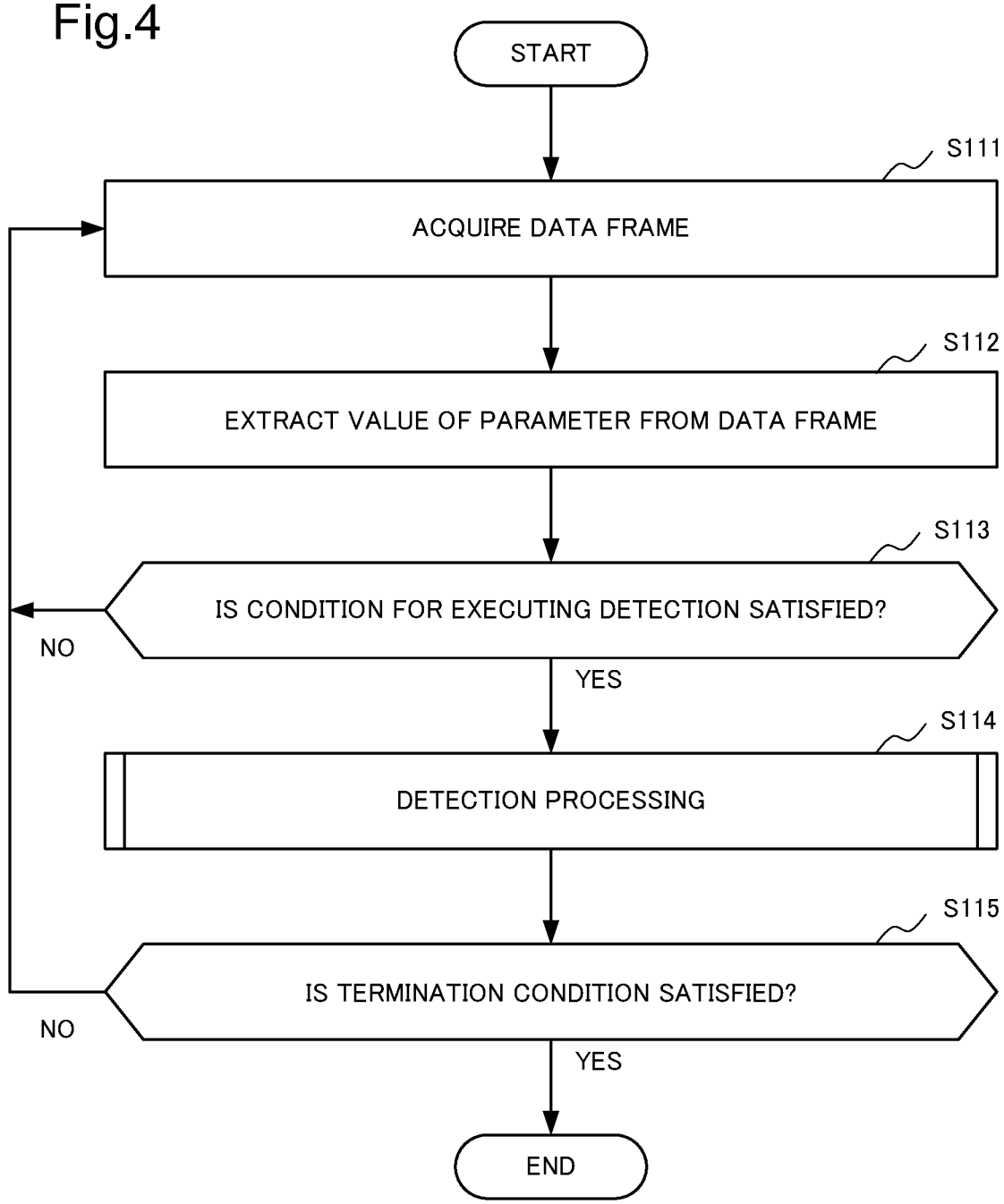
FIG. 4 is a first flowchart illustrating an example of an operation in a detection phase of the surveillance device according to the first and fourth example embodiments of the present invention.

FIG. 4 is a first flowchart illustrating an example of the operation in the detection phase of the surveillance device 100 of the present example embodiment. The surveillance device 100 may be set to start the operation in the detection phase in a case where an operator has not given an instruction to start the operation in the learning phase. The surveillance device 100 may start the operation in the detection phase in accordance with an instruction from an operator. In the following description, it is assumed that an anomaly data frame may flow through the bus 600 during the operation of the detection phase.

First, the acquisition unit 110 acquires a data frame flowing through the bus 600 (step S111). The operation in step S111 may be the same as the operation in step S101 in the learning phase.

Next, the calculation unit 120 extracts a value of a parameter from the acquired data frame (step S112). The operation in step S112 may be the same as the operation in step S102 in the learning phase. The calculation unit 120 determines whether a condition for executing the detection is satisfied, and if the condition for executing the detection is not satisfied as a result of the determination (NO in step S113), the operation of the surveillance device 100 returns to step S111. The condition for executing the detection may be the same as the condition for executing the update in the learning phase.

If the condition for executing the detection is satisfied (YES in step S113), the surveillance device 100 executes detection processing (step S114). The detection processing in step S114 will be described later in detail.

If a termination condition is not satisfied (NO in step S115), the surveillance device 100 repeats the operation from step S111. If the termination condition is satisfied (YES in step S115), the surveillance device 100 ends the operation illustrated in FIG. 4. The termination condition may be, for example, termination of the operation of the vehicle on which the on-board network 1 is mounted. The termination condition is not limited to the above example.

Next, an operation of the detection processing in the detection phase of the surveillance device 100 of the present example embodiment will be described.

Figure 5:
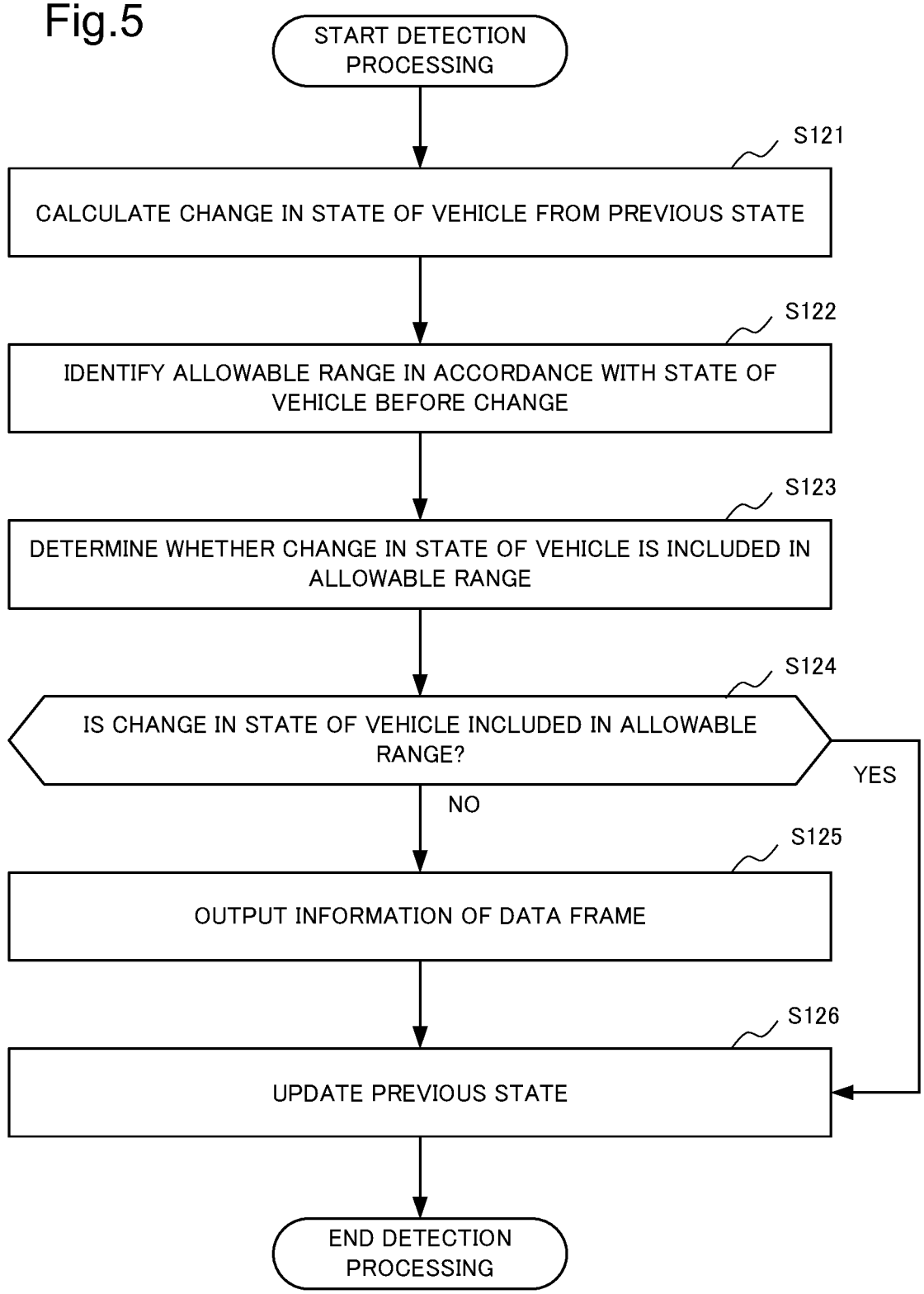
FIG. 5 is a second flowchart illustrating an example of an operation in a detection phase of the surveillance device according to the first example embodiment of the present invention.

FIG. 5 is a second flowchart illustrating an example of the operation in the detection phase of the surveillance device 100 of the present example embodiment. Specifically, FIG. 5 illustrates an example of the operation of the detection processing in the detection phase of the surveillance device 100 of the present example embodiment.

First, the calculation unit 120 calculates a change in the state of the vehicle from the previous state (step S121). The operation in step S121 may be the same as the operation in step S104 in the learning phase. However, in the detection phase, the calculation unit 120 sends, not to the generation unit 130 but to the determination unit 170, information representing the previous state and the calculated change in the state of the vehicle.

Next, the determination unit 170 identifies an allowable range of change in the state of the vehicle in accordance with the previous state (i.e., the state of the vehicle before the change) from allowable ranges stored in the rule storage unit 160 (step S122). The determination unit 170 may identify an allowable range in accordance with the previous state in a feature space represented by a combination, which is one of a plurality of combinations of parameters, including a parameter whose change in value is included in the received change in the state of the vehicle. Furthermore, the determination unit 170 may read information representing the identified allowable range from the rule storage unit 160. In a case where the number of feature spaces obtained from combinations including a parameter whose change in value is included in the received change in the state of the vehicle is equal to or more than two, the determination unit 170 may identify all allowable ranges in the feature spaces and read all pieces of information representing the identified allowable ranges.

The determination unit 170 determines whether the change in the state of the vehicle is included in the identified allowable range (step S123). If the change in the state of the vehicle is included in the allowable range (YES in step S124), the calculation unit 120 updates the previous state (step S126), and the surveillance device 100 ends the operation illustrated in FIG. 5. In a case where a plurality of allowable ranges has been identified, the determination unit 170 determines that the change in the state of the vehicle is included in the allowable ranges if the change in the state of the vehicle is included in all the identified allowable ranges.

If the change in the state of the vehicle is not included in the allowable range (NO in step S124), the output unit 180 makes a notification about information of the data frame acquired in step S111 (step S125). In a case where a plurality of allowable ranges has been identified, the determination unit 170 determines that the change in the state of the vehicle is not included in the allowable ranges if the change in the state of the vehicle is not included in at least one of the identified allowable ranges. Then, the calculation unit 120 updates the previous state (step S126), and the surveillance device 100 ends the operation illustrated in FIG. 5. The calculation unit 120 may perform the operation of step S126 at any timing after step S121.

<<Effect>>

The present example embodiment described above has an effect of improving an accuracy of detecting an anomaly frame from frames that contain data representing a state of a vehicle and flow through a network.

This is because the determination unit 170 determines whether a change in the state of the vehicle is included in an allowable range in accordance with the previous state (i.e., the state of the vehicle before the change). For example, there is a case in which a change in the state of the vehicle is normal as a change from a certain state, but is abnormal as a change from another state. In such a case, determining whether the change in the state of the vehicle is normal or abnormal on the basis of the same allowable range regardless of the state of the vehicle before the change results in a lower accuracy of the determination. Determining whether the change in the state of the vehicle is normal or abnormal on the basis of an allowable range in accordance with the state of the vehicle before the change improves the accuracy of the determination. Thus, the accuracy of detecting an anomaly frame indicating an abnormal state of the vehicle is improved.

<<First Modification>>

A modification of the first example embodiment will be described below.

Figure 6:
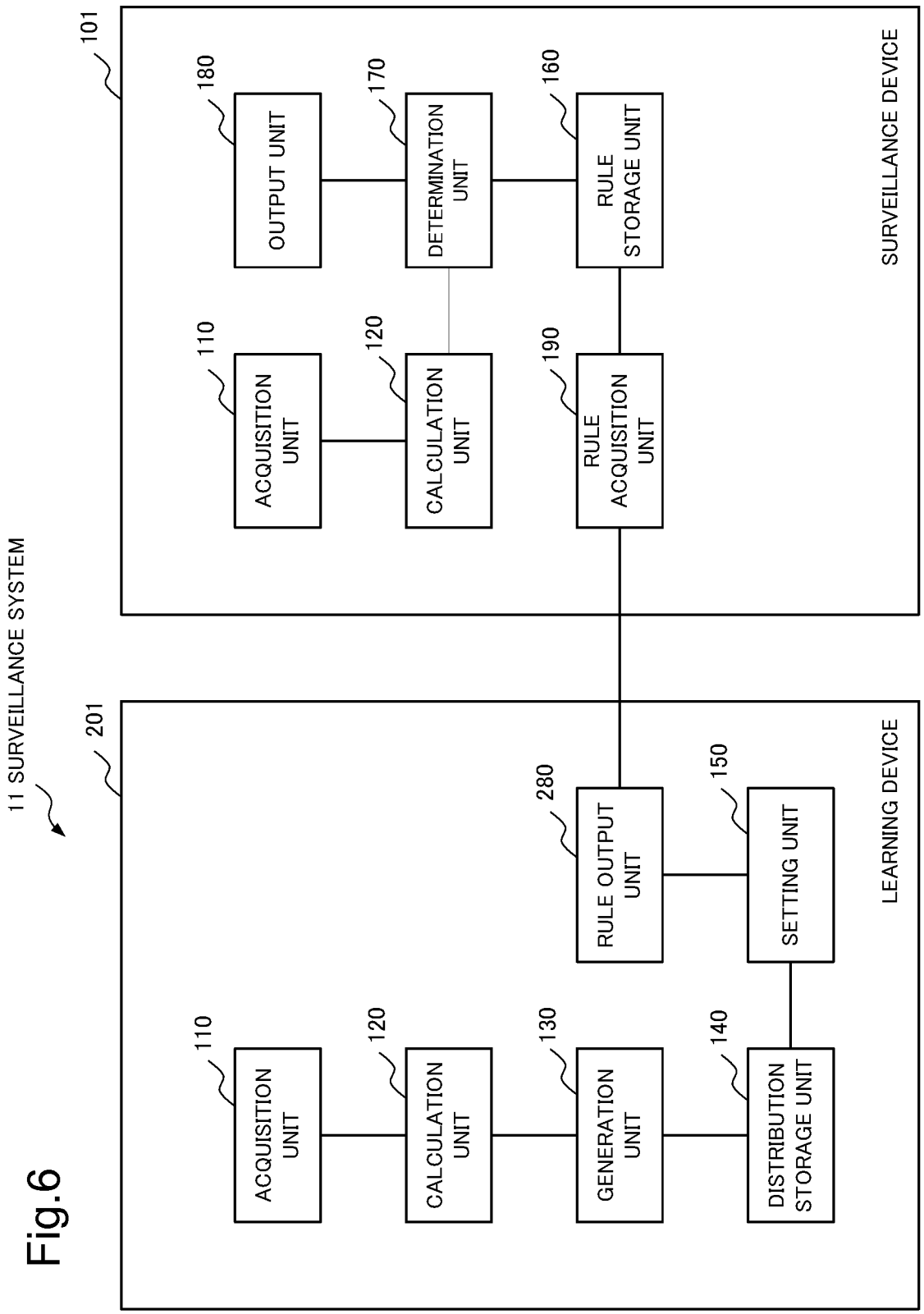
FIG. 6 is a block diagram illustrating an example of a configuration of a surveillance system according to a first modification of the first and fourth example embodiments of the present invention.

FIG. 6 is a block diagram illustrating an example of a configuration of a surveillance system according to a first modification of the first example embodiment.

A surveillance system 11 illustrated in FIG. 6 includes a learning device 201 and a surveillance device 101. The surveillance system 11 can be replaced with the surveillance device 100 illustrated in FIG. 2.

The learning device 201 includes the acquisition unit 110, the calculation unit 120, the generation unit 130, the distribution storage unit 140, the setting unit 150, and a rule output unit 280. The surveillance device 101 includes the acquisition unit 110, the calculation unit 120, the rule storage unit 160, the determination unit 170, the output unit 180, and a rule acquisition unit 190.

Elements included in the learning device 201 and assigned with the same names and reference numerals as elements included in the surveillance device 100 of the first example embodiment have functions similar to the functions in the learning phase of the elements included in the surveillance device 100 of the first example embodiment and assigned with the same names and reference numerals. These elements included in the learning device 201 perform an operation similar to the operation in the learning phase of the elements included in the surveillance device 100 of the first example embodiment and assigned with the same names and reference numerals. Differences will be described below.

The setting unit 150 sends a set allowable range to the rule output unit 280.

The rule output unit 280 receives an allowable range from the setting unit 150 and sends the received allowable range to the surveillance device 101.

Elements included in the surveillance device 101 and assigned with the same names and reference numerals as elements included in the surveillance device 100 of the first example embodiment have functions similar to the functions in the detection phase of the elements included in the surveillance device 100 of the first example embodiment and assigned with the same names and reference numerals. These elements included in the surveillance device 101 perform an operation similar to the operation in the detection phase of the elements included in the surveillance device 100 of the first example embodiment and assigned with the same names and reference numerals. Differences will be described below.

In the learning phase, the rule acquisition unit 190 receives an allowable range from the rule output unit 280 of the learning device 201. The rule acquisition unit 190 stores the received allowable range in the rule storage unit 160.

<<Second Modification>>

Figure 7:
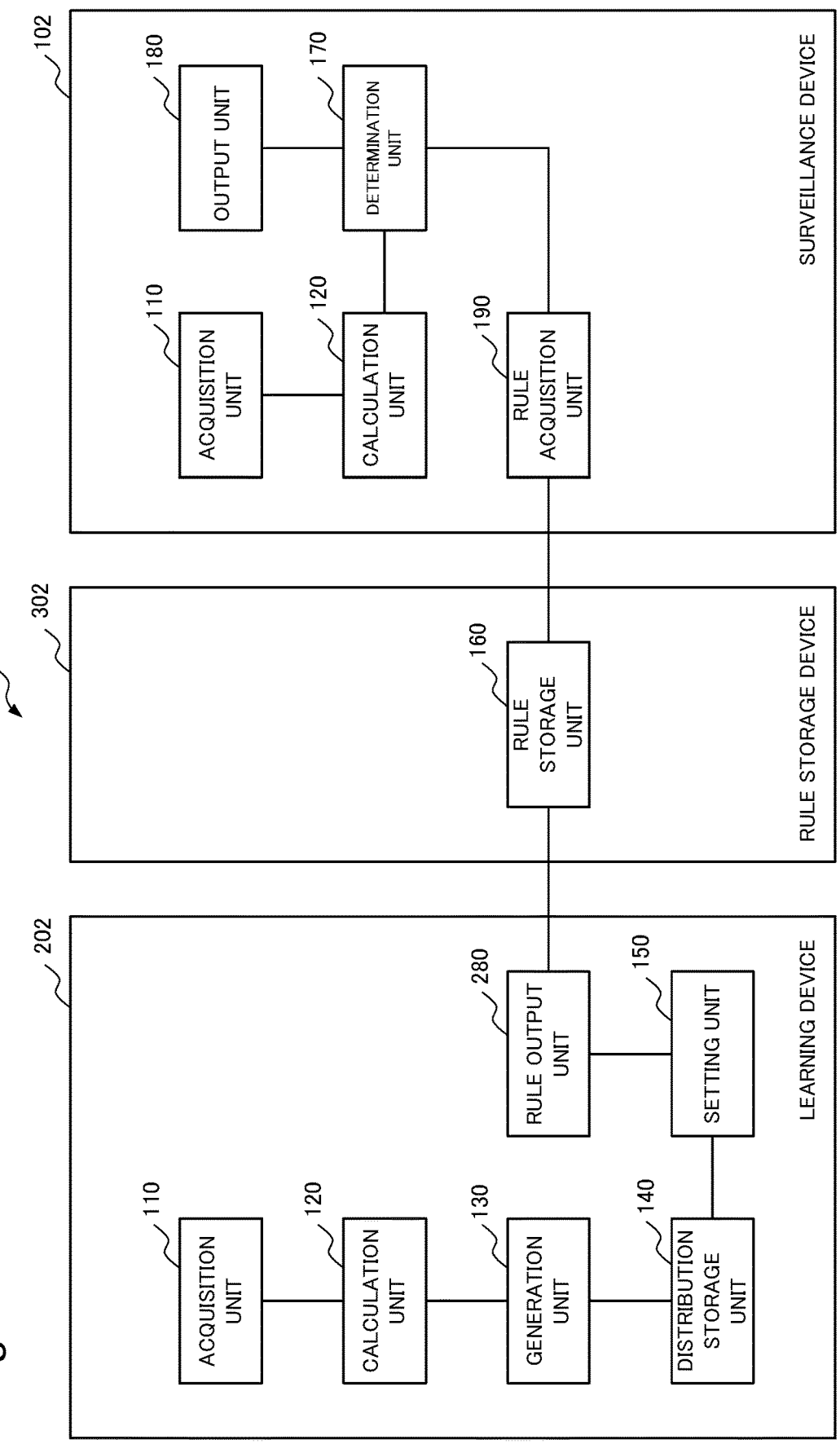
FIG. 7 is a block diagram illustrating an example of a configuration of a surveillance system according to a second modification of the first and fourth example embodiments of the present invention.

FIG. 7 is a block diagram illustrating an example of a configuration of a surveillance system according to a second modification of the first example embodiment.

A surveillance system 12 illustrated in FIG. 7 includes a learning device 202, a rule storage device 302, and a surveillance device 102. The surveillance system 12 can be replaced with the surveillance device 100 illustrated in FIG. 2.

The learning device 202 includes the acquisition unit 110, the calculation unit 120, the generation unit 130, the distribution storage unit 140, the setting unit 150, and the rule output unit 280. The rule storage device 302 includes the rule storage unit 160. The surveillance device 102 includes the acquisition unit 110, the calculation unit 120, the determination unit 170, the output unit 180, and the rule acquisition unit 190.

Elements included in the learning device 202 and assigned with the same names and reference numerals as elements included in the surveillance device 100 of the first example embodiment have functions similar to the functions in the learning phase of the elements included in the surveillance device 100 of the first example embodiment and assigned with the same names and reference numerals. These elements included in the learning device 202 perform an operation similar to the operation in the learning phase of the elements included in the surveillance device 100 of the first example embodiment and assigned with the same names and reference numerals. Differences will be described below.

The setting unit 150 sends a set allowable range to the rule output unit 280.

The rule output unit 280 receives an allowable range from the setting unit 150 and stores the received allowable range in the rule storage unit 160 of the rule storage device 302.

Elements included in the surveillance device 102 and assigned with the same names and reference numerals as elements included in the surveillance device 100 of the first example embodiment have functions similar to the functions in the detection phase of the elements included in the surveillance device 100 of the first example embodiment and assigned with the same names and reference numerals. These elements included in the surveillance device 102 perform an operation similar to the operation in the detection phase of the elements included in the surveillance device 100 of the first example embodiment and assigned with the same names and reference numerals. Differences will be described below.

The rule acquisition unit 190 accesses the rule storage unit 160 of the rule storage device 302 and acquires an allowable range from the rule storage unit 160.

The rule storage unit 160 has a function similar to that of the rule storage unit 160 of the surveillance device 100 of the first example embodiment.

<<Third Modification>>

In a third modification, any of the configurations of the first example embodiment, the first modification, and the second modification may be adopted. The third modification is different from the first example embodiment, the first modification, and the second modification as described below.

In the third modification, in a case where parameters values of which have been read from an acquired data frame include a parameter a value of which is stored as the state of the vehicle, the calculation unit 120 calculates a change in the state of the vehicle even in a case where there is a parameter a value of which is not stored as the state of the vehicle. Specifically, the calculation unit 120 of the third modification may calculate, as a change in the state of the vehicle, a difference between a value of each parameter read from an acquired data frame as a change in the state of the vehicle and a value stored as the state of the vehicle. In other words, in a case where there is a parameter a value of which is not stored as the state of the vehicle among parameters values of which have been read from an acquired data frame, the calculation unit 120 assumes that the value of that parameter has remained unchanged.

The calculation unit 120 updates the state of the vehicle for each parameter a value of which has been read from an acquired data frame. In other words, the calculation unit 120 sets parameter values read from an acquired data frame as values of parameters stored as the state of the vehicle.

Other components may operate similarly to the components of the first example embodiment. Other components may operate similarly to the components of the first modification. Other components may operate similarly to the components of the second modification.

<<Fourth Modification>>

Components of a fourth modification of the first example embodiment operate similarly to components of the first example embodiment assigned with the same reference numerals and having the same names, except for the differences described below.

The condition for executing the update in step S103 may be, for example, that a predetermined period of time has passed since a distribution of change in parameter values has been updated. In this case, the calculation unit 120 may generate, in step S104, a latest state on the basis of values of parameters contained in data frames acquired during the predetermined period of time since the distribution of change in parameter values has been updated. For example, the calculation unit 120 may set a value of each parameter contained in at least one of the data frames acquired during the predetermined period of time to a value contained in the latest acquired data frame among data frames containing that value.

<<Fifth Modification>>

Components of a fifth modification of the first example embodiment operate similarly to components of the first example embodiment assigned with the same reference numerals and having the same names, except for the differences described below.

A network in which the surveillance device 100 determines whether an acquired data frame is an abnormal data frame is not limited to an on-board network. That is, the surveillance device 100 may determine whether a data frame sent to a network that is not an on-board network mounted on a vehicle is an abnormal data frame. The surveillance device 100 may be connected to a network through which a data frame containing a value of a parameter representing, for example, a state of an apparatus, other than a state of a vehicle, flows, and determine whether the data frame is abnormal. In other words, the surveillance device 100 of the fifth modification may be connected to a network through which a data frame containing a value of a parameter representing a state of an apparatus (including a vehicle) flows, and determine whether the data frame is abnormal.

Second Example Embodiment

Next, a second example embodiment of the present invention will be described in detail with reference to the drawings.

<<Configuration>>

First, a configuration of a surveillance device 103 of the present example embodiment will be described.

Figure 8:
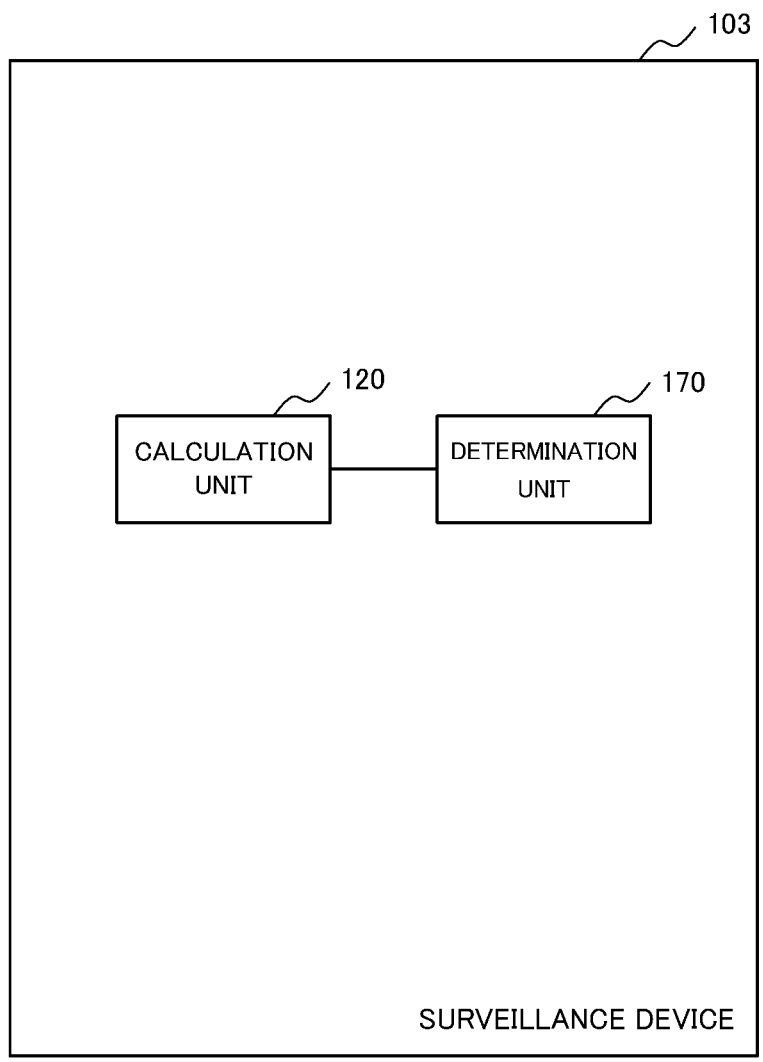
FIG. 8 is a block diagram illustrating an example of a configuration of a surveillance device according to a second example embodiment of the present invention.

FIG. 8 is a block diagram illustrating an example of the configuration of the surveillance device 103 of the present example embodiment.

The surveillance device 103 illustrated in FIG. 8 includes a calculation unit 120 and a determination unit 170. The calculation unit 120 calculates a change in a state of an apparatus on the basis of a value of a parameter contained in a received data frame and representing the state of the apparatus. The determination unit 170 determines whether the change is included in an allowable range determined in accordance with the state of the apparatus before the change.

<<Operation>>

Next, an operation of the surveillance device 103 of the present example embodiment will be described.

Figure 9:
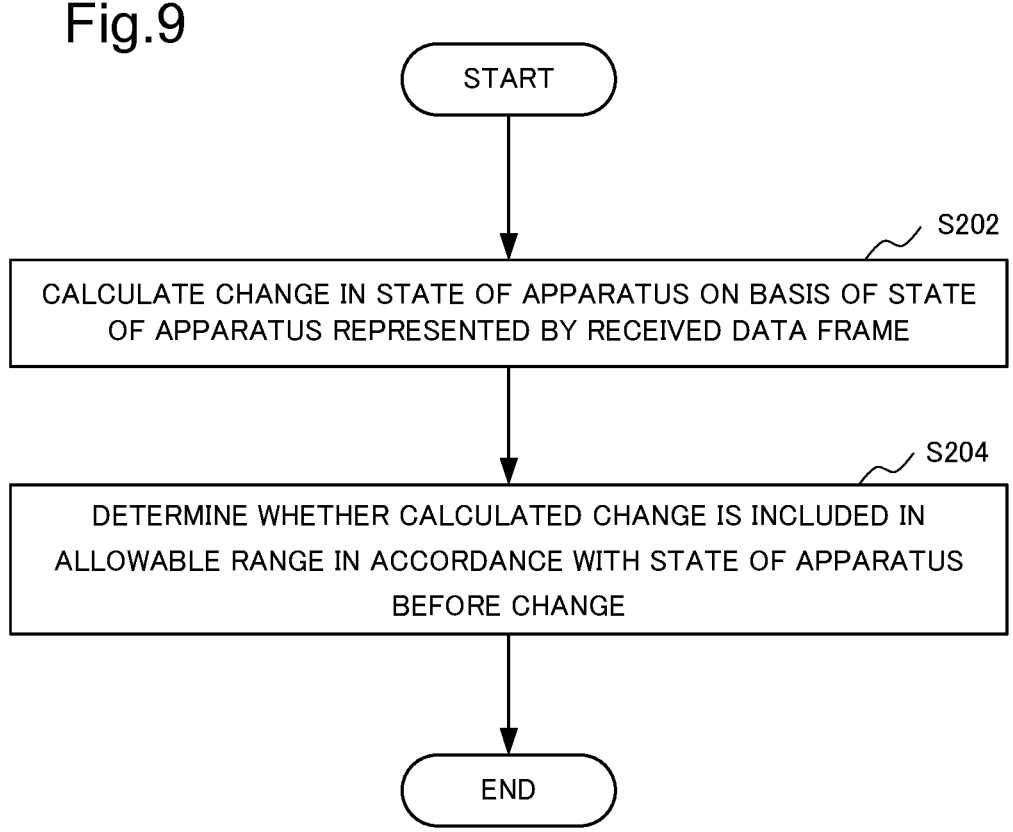
FIG. 9 is a flowchart illustrating an example of an operation of the surveillance device according to the second example embodiment of the present invention.

FIG. 9 is a flowchart illustrating an example of the operation of the surveillance device 103 of the present example embodiment.

In the operation illustrated in FIG. 9, first, the calculation unit 120 calculates a change in the state of the apparatus on the basis of the state of the apparatus represented by a received data frame (step S202). As described above, the apparatus is, for example, a vehicle. The data frame is a data frame that flows through an on-board network mounted on the vehicle. The calculation unit 120 may store in advance a calculated state of the apparatus before the change. The calculation unit 120 may send, to the determination unit 170, information representing the state of the apparatus represented by the acquired data frame and information representing the state before the change.

The determination unit 170 determines whether the calculated change in the state of the apparatus is included in an allowable range in accordance with the state of the apparatus before the change (step S204).

Then, the surveillance device 103 ends the operation illustrated in FIG. 9.

<<Effect>>

The present example embodiment has the same effect as the first example embodiment. This is because the determination unit 170 determines whether a change in the state of the apparatus calculated by the calculation unit 120 is included in an allowable range in accordance with the state of the apparatus before the change.

Third Example Embodiment

Next, a third example embodiment of the present invention will be described in detail with reference to the drawings.

<<Configuration>>

First, a configuration of a learning device according to the present example embodiment will be described.

Figure 10:
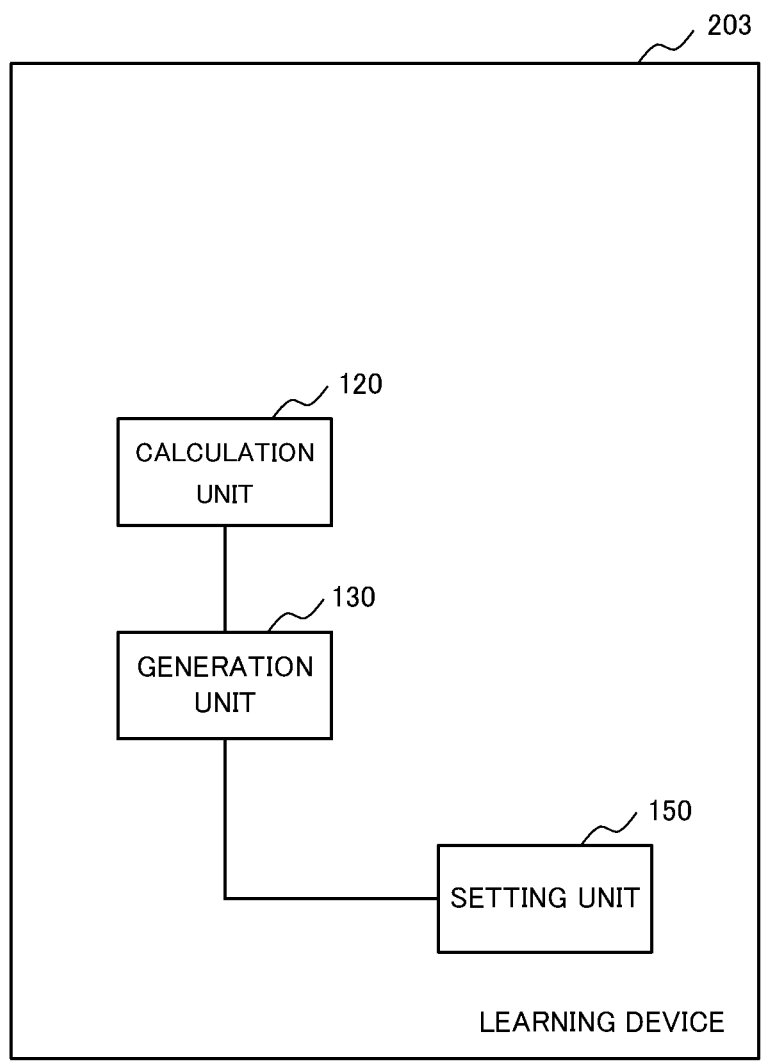
FIG. 10 is a block diagram illustrating an example of a configuration of a learning device according to a third example embodiment of the present invention.

FIG. 10 is a block diagram illustrating an example of a configuration of a learning device 203 of the present example embodiment.

In the example illustrated in FIG. 10, the learning device 203 includes a calculation unit 120, a generation unit 130, and a setting unit 150. The calculation unit 120 calculates a change in a state of an apparatus on the basis of a value of a parameter contained in a received data frame and representing the state of the apparatus. The generation unit 130 generates a distribution of the change in accordance with the state of the apparatus before the change. The setting unit 150 sets an allowable range of the change based on the generated distribution.

<<Operation>>

Next, an operation of the learning device according to the present example embodiment will be described.

Figure 11:
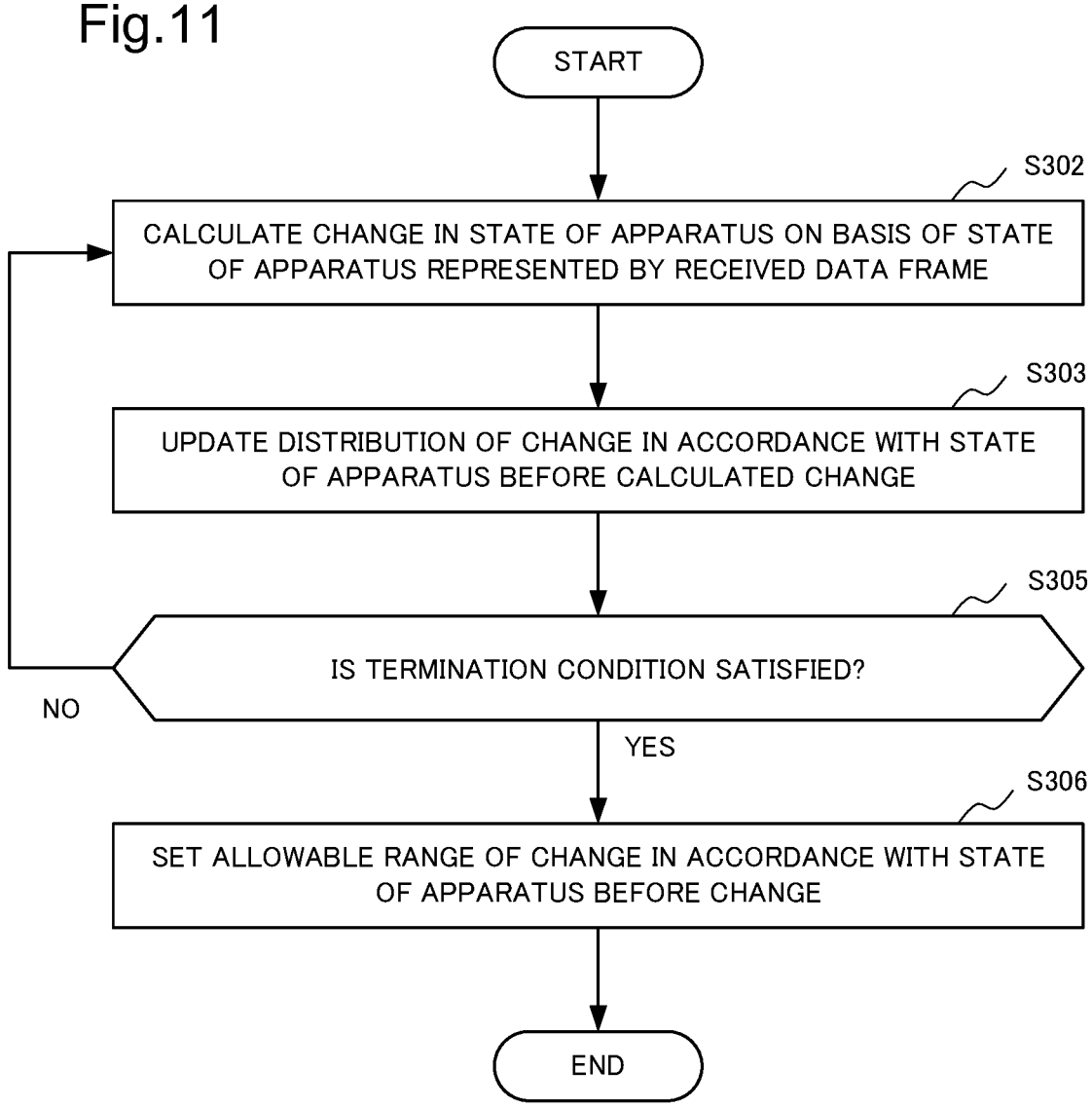
FIG. 11 is a flowchart illustrating an example of an operation of the learning device 203 according to the third example embodiment of the present invention.

FIG. 11 is a flowchart illustrating an example of an operation of the learning device 203 according to the present example embodiment.

In the example illustrated in FIG. 11, first, the calculation unit 120 calculates a change in the state of the apparatus on the basis of the state of the apparatus represented by a received data frame (step S302).

Next, the generation unit 130 updates a distribution of change in accordance with the state of the apparatus before the calculated change (step S303).

If a termination condition is not satisfied (NO in step S305), the learning device 203 repeats the operations of step S302 and step S303. The termination condition may be the same as the termination condition in the first example embodiment shown in step S107 in FIG. 3. By repeating the operation of step S303, the generation unit 130 generates a distribution of change in the state of the apparatus in accordance with the previous state.

If the termination condition is satisfied (YES in step S305), the setting unit 150 sets an allowable range of change in accordance with the previous state based on a distribution generated for each previous state (step S306). The set allowable range of change may be output to, for example, a surveillance device that uses the allowable range to detect an anomaly data frame.

<<Effect>>

The present example embodiment has an effect of contributing to an improvement of an accuracy of detecting an anomaly frame from frames containing data representing a state of a vehicle flowing through a network.

This is because the setting unit 150 sets an allowable range in accordance with the state of the apparatus before a change in the state of the apparatus. For example, there is a case in which a change in the state of the apparatus is normal as a change from a certain state, but is abnormal as a change from another state. In such a case, determining whether the change in the state of the apparatus is normal or abnormal on the basis of the same allowable range regardless of the state of the apparatus before the change results in a lower accuracy of the determination. Determining whether the change in the state of the apparatus is normal or abnormal on the basis of an allowable range in accordance with the state of the apparatus before the change improves the accuracy of the determination. Thus, the accuracy of detecting an anomaly frame indicating an abnormal state of the apparatus is improved.

Fourth Example Embodiment

<<Configuration>>

Next, a fourth example embodiment of the present invention will be described in detail with reference to the drawings.

FIG. 1 is a block diagram illustrating an example of a configuration of a surveillance device 100 of the present example embodiment. The surveillance device 100 of the present example embodiment includes an acquisition unit 110, a calculation unit 120, a generation unit 130, a distribution storage unit 140, a setting unit 150, a rule storage unit 160, a determination unit 170, and an output unit 180. The configuration of the surveillance device 100 of the present example embodiment is the same as the configuration of the surveillance device 100 of the first example embodiment. The acquisition unit 110, the calculation unit 120, the generation unit 130, the distribution storage unit 140, and the output unit 180 of the present example embodiment have the same functions as those of the units assigned with the same names and reference numerals in the first example embodiment, and operate in a similar manner.

The following description mainly concerns differences between the surveillance device 100 of the present example embodiment and the surveillance device 100 of the first example embodiment.

In the present example embodiment, parameters are classified into two types. A first type of parameters are parameters that are "continuous". A second type of parameters are parameters that are "discrete".

The parameters that are continuous are, for example, parameters in which the number of possible values of each parameter is larger than a predetermined number. Such a parameter that is continuous is hereinafter referred to as a "continuous parameter". A continuous parameter may be a parameter that can take a real value. A parameter range that a continuous parameter can take may not be limited. A continuous parameter may be a parameter that can take any of real values included in a predetermined range. A continuous parameter may be a parameter that can take any of real values the number of which is larger than a predetermined number. A value of a continuous parameter may not be a real number. A continuous parameter may be, for example, a parameter that can take any of integer values the number of which is larger than a predetermined number. A continuous parameter may be, for example, a parameter that can take any of numerical values (including an integer value and a real value) the number of which is larger than a predetermined number. A continuous parameter may be a parameter that can take any of state values the number of which is larger than a predetermined number. In this case, the state values may be assigned with, for example, integers or real numbers included in a predetermined range. Then, the state values may be treated as the integers or real numbers assigned to the state values. The number of values that a continuous parameter can take may not be limited. A range of values that a continuous parameter can take may not be limited. A continuous parameter is, for example, a vehicle speed, an accelerator opening, a brake pedal pressing, a steering wheel angle, or a yaw rate. The "brake pedal pressing" is a value representing a degree of pressing on a brake pedal. The brake pedal pressing may represent, for example, a magnitude of force applied to the brake pedal. The brake pedal pressing may represent, for example, a pressure at any portion in a brake system, such as a hydraulic pressure that depends on a magnitude of force applied to the brake pedal. In these cases, the brake pedal pressing may be, for example, a measurement value obtained by a pressure sensor attached to the brake system. The brake pedal pressing may be represented by, for example, a magnitude of movement of the brake pedal from a state where the brake pedal is not pressed. In this case, the magnitude of movement of the brake pedal may be derived from, for example, an output of a sensor for measuring a position of the brake pedal. Continuous parameters are not limited to the above examples.

The parameters that are discrete are, for example, parameters in which the number of possible values of each parameter is less than a predetermined number. The predetermined number may be, for example, determined in advance. Such a parameter that is discrete is hereinafter referred to as a "discrete parameter". Possible values of a discrete parameter may be any of real values, integer values, state values, or the like. A discrete parameter may be, for example, a shift position, a state of a parking brake lever, an open/closed state of a door, a lighting state of a light, a lighting state of a blinker, or the like. Discrete parameters are not limited to the above examples.

Hereinafter, a space based on a discrete parameter is referred to as a discrete space, and a space based on a continuous parameter is referred to as a continuous value space. In a case where the number of discrete parameters is n (n is an integer equal to or greater than 1), the discrete space is an n-dimensional space. In a case where the number of continuous parameters is m (m is an integer equal to or greater than 1), the continuous value space is an m-dimensional space. A combination of values of these n discrete parameters is represented by a point (specifically, coordinates of a point) in the discrete space. A change in values of these n discrete parameters can be represented by an n-dimensional vector in the discrete space. A combination of values of these m continuous parameters is represented by a point (specifically, coordinates of a point) in the continuous value space. A change in values in the combination of values of these m continuous parameters can be represented by an m-dimensional vector in the continuous value space.

The values of these n discrete parameters are also referred to as a combination of discrete parameter values. The values of these n discrete parameters may be referred to simply as discrete parameter values. A change in values of these n discrete parameters may be referred to simply as a change in the combination of discrete parameter values. A change in values of these n discrete parameters may be referred to simply as a change in the discrete parameter values. The values of these m continuous parameters are also referred to as a combination of continuous parameter values. The values of these m continuous parameters may be referred to simply as the continuous parameter values. A change in values of these m continuous parameters may be referred to simply as a change in the combination of continuous parameter values. A change in values of these m continuous parameters may be referred to simply as a change in the continuous parameter values.

In a learning phase, similarly to the generation unit 130 of the first example embodiment, the generation unit 130 first identifies a distribution of amount of change in accordance with a state of a vehicle before it has changed into the state of the vehicle indicated by a data frame (i.e., the previous state described above). More specifically, the generation unit 130 identifies, from a distribution of amount of change stored in the distribution storage unit 140, a distribution of amount of change in a feature space obtained from a combination of parameters including a parameter a value of which is contained in the acquired data frame from a state before the state of the vehicle represented by the acquired data frame. The data frame used by the generation unit 130 is a data frame acquired from the vehicle that has been confirmed to be operating normally.

However, the generation unit 130 of the present example embodiment identifies, for each combination of discrete parameter values, a distribution of amount of change from each combination of continuous parameter values. In other words, the generation unit 130 of the present example embodiment identifies, for each point in a discrete space, a distribution of amount of change at each point in a continuous value space. Furthermore, for each combination of discrete parameter values, the generation unit 130 of the present example embodiment identifies a distribution of combinations of continuous parameter values for each change from the combination of discrete parameter values. In other words, the generation unit 130 of the present example embodiment identifies a distribution of points in a continuous value space for each change at each point in a discrete space.

In the learning phase, the setting unit 150 sets an allowable range of amount of change for each of the distributions of amount of change stored in the distribution storage unit 140.

However, on the basis of a combination of discrete parameter values and a combination of continuous parameter values, the setting unit 150 of the present example embodiment sets an allowable range of change in the combination of continuous parameter values. In other words, the setting unit 150 of the present example embodiment sets an allowable range of change from each point in a continuous value space for each point in a discrete space. The setting unit 150 of the present example embodiment further sets, for each combination of discrete parameter values, an allowable range of amount of change in the combination of discrete parameter values based on the combination of discrete parameter values and a combination of continuous parameter values. In other words, the setting unit 150 of the present example embodiment further sets, for each point in a discrete space, an allowable range of amount of change from that point in the discrete space based on the point in the discrete space and a point in a continuous value space.

The generation unit 130 and the setting unit 150 will be described in more detail below.

The generation unit 130 of the present example embodiment generates a distribution of continuous parameter values (in other words, a normal distribution) for each combination of discrete parameter values. In other words, the generation unit 130 generates a distribution of continuous parameter values (i.e., a normal distribution) in a continuous value space for each point representing a combination of discrete parameter values in a discrete space. A set of states of the vehicle with the same combination of discrete parameter values is represented as points in a discrete space. Even in a case of states of the vehicle with the same combination of discrete parameter values, continuous parameter values of these states of the vehicles are not always the same.

The generation unit 130 identifies, for each combination of discrete parameter values, a distribution of amount of change in the continuous parameter values in a normal state from each point in a generated normal distribution (hereinafter also referred to as a distribution of change). In other words, the generation unit 130 identifies, for each point in a discrete space, a distribution of amount of change in the continuous parameter values at each point included in a normal distribution in a continuous value space. In other words, the generation unit 130 identifies, for each combination of values, a distribution of amount of change in a combination of continuous parameter values from a combination of the same values in a set of states of the vehicle having the same discrete parameter values. The generation unit 130 may identify a distribution of amount of change in the continuous parameter values for each of a plurality of partial regions into which a continuous value space has been divided according to a predetermined rule. In other words, the generation unit 130 may identify, for each of a plurality of partial regions set in a continuous value space, a distribution of amount of change in the continuous parameter values from a combination of continuous parameter values represented as a point included in the partial region. In other words, the generation unit 130 may identify, for each partial region, a distribution of amount of change in a combination of continuous parameter values from a combination of values included in the same partial region in a set of states of the vehicle having the same discrete parameter values.

For each combination of discrete parameter values, the setting unit 150 sets, from the identified distribution of amount of change, an allowable range of change in the continuous parameter values based on the continuous parameter values. In other words, the setting unit 150 sets, for each point in a discrete space, an allowable range of change in the continuous parameter values from each point included in a distribution of the continuous parameters in a continuous value space. In other words, the setting unit 150 sets an allowable range of amount of change in a combination of continuous parameter values from a combination of the same values in a set of states of the vehicle having the same combination of discrete parameter values. The setting unit 150 may set an allowable range of amount of change in the continuous parameter values for each of the partial regions described above. In other words, the setting unit 150 may set, for each partial region, an allowable range of amount of change from a combination of values included in the same partial region of continuous parameters. The method of setting an allowable range by the setting unit 150 may be the same as the method of setting an allowable range in the first example embodiment.

In a case where an allowable range is set as described above, a distribution of continuous parameter values (i.e., a normal distribution) is determined in accordance with a combination of discrete parameter values. Furthermore, when a point (i.e., a combination of continuous parameter values) is determined in a distribution of continuous parameter values determined in accordance with a combination of discrete parameters, an allowable range of change in the continuous parameter values is determined. In other words, it can be said that an allowable range of amount of change in the continuous parameter values is determined in accordance with a combination of discrete parameter values and a combination of continuous parameter values.

Furthermore, for each combination of discrete parameter values, the generation unit 130 may generate, for each change from the combination of discrete parameter values, a distribution of combinations of continuous parameter values before the change.

Furthermore, in a range of distribution of continuous parameter values determined for each combination of discrete parameter values, the setting unit 150 may set one or more regions and an allowable range of change in the discrete parameter values for each region. A change in the discrete parameter values is represented by, for example, a point-to-point movement in a discrete space. An allowable range of change in the discrete parameter values is represented by a set of point-to-point movements in a discrete space. Thus, an allowable range of change in the discrete parameter values can be represented by a set of points in a discrete space. In the following description, point A is one of points indicating combinations of discrete parameter values in a discrete space. The same applies to points B, C, D, and the like. For example, a change from a combination of values represented by point A in a discrete space is represented by a movement from point A to another point or point A. Thus, an allowable range of change in value from point A can be represented by a set of points to which a movement from point A is possible.

The setting unit 150 sets an allowable range of change in value from a certain point (for example, point A) in a discrete space as described below, for example.

The setting unit 150 may identify a distribution of continuous parameter values in a continuous value space before a change in a combination of discrete parameter values from point A to another point (for example, point B). Then, on the basis of the identified distribution, the setting unit 150 may set a region in which continuous parameter values can be distributed in the continuous value space before the change in the combination of discrete parameter values from point A to point B. For example, the setting unit 150 may assume that the identified distribution is an m-dimensional normal distribution. Then, the setting unit 150 may calculate a standard deviation of the identified distribution in a distribution in a direction of each of m coordinate axes, and identify a range in which a difference from an average in each coordinate axis direction is a constant multiple of the standard deviation, as a region in which continuous parameter values can be distributed. The setting unit 150 may identify a range of predetermined shape that includes all distributions of continuous parameter values before the change in the combination of discrete parameter values from point A to point B. The predetermined shape may be an m-dimensional rectangular parallelepiped. The predetermined shape may be an m-dimensional ellipsoid. The predetermined shape is not limited to the above examples. The region in which continuous parameter values can be distributed in the continuous value space before the change from point A to point B, the region being set by the setting unit 150 as described above, is referred to as a transitionable region from point A to point B.

Similarly, the setting unit 150 sets, for each point to which a change from point A indicated by the combination of discrete parameter values in the discrete space is possible, a region in which the continuous parameter values are distributed in the continuous value space before the change, in a similar manner. In the discrete space, the points to which a change from point A is possible are referred to as transitionable points from point A. In other words, the setting unit 150 sets, for each of the transitionable points from point A, a transitionable region from point A to the transitionable point. In a case where a combination of continuous parameter values (i.e., a point represented by the combination of continuous parameter values) is included in a transitionable region, a transitionable point from point A is referred to as a transitionable point relating to the transitionable region, and the transitionable region is referred to as a transitionable region from point A. The setting unit 150 may set a region in which the continuous parameter values are distributed in the continuous value space in a case where the discrete parameter values do not change.

The setting unit 150 may identify, among the transitionable regions from point A, a region that does not overlap with other transitionable regions from point A and a region in which two or more transitionable regions from point A overlap. In a case where a region in which two or more transitionable regions from point A overlap includes a point representing a combination of continuous parameter values, the combination of discrete parameter values may change from point A to any of transitionable points relating to the two or more transitionable regions. The setting unit 150 may set a region in which two or more transitionable regions overlap as a transitionable region from point A to a combination of transitionable points relating to the two or more transitionable regions. A transitionable region that does not overlap with other transitionable regions is a transitionable region from point A to a transitionable point (i.e., a combination of transitionable points that includes only that transitionable point) relating to the transitionable region.

As described above, the setting unit 150 identifies a region in which the same transitionable regions overlap and a region in a transitionable region in which transitionable regions do not overlap, in the continuous value space, and sets the identified region as a new transitionable region to a combination of transitionable points relating to the overlapping transitionable regions. Then, the setting unit 150 identifies a combination of transitionable points relating to the set new transitionable region. In this case, an amount of change from point A to each point included in the combination of transitionable points relating to the transitionable region including a point represented by a combination of continuous parameter values is an allowable range based on the combination of continuous parameter values of point A. The setting unit 150 sets an amount of change from point A to each of the transitionable points included in the identified combination as an allowable range of amount of change in the discrete space in a case where the set transitionable region includes a combination of continuous parameter values. In a case where a transitionable point is point A, it indicates that the point indicated by the combination of discrete parameter values does not need to change from point A.

For each point in the discrete space, the setting unit 150 sets a combination of a transitionable region in the continuous value space and an allowable range in the discrete space. Then, the setting unit 150 associates the transitionable region in the continuous value space with the allowable range in the discrete space included in the identified combination.

The setting unit 150 stores, in the rule storage unit 160, information representing the set allowable range. In the present example embodiment, the information representing the allowable range includes information representing the allowable range in the continuous value space and information representing the allowable range in the discrete space. The information representing the allowable range in the continuous value space is information that represents an allowable range of each point indicated by a combination of values that the continuous parameters can take in the continuous value space at each point that the discrete parameters can take in the discrete space. In other words, the information representing the allowable range in the continuous value space is information that represents an allowable range of amount of change from each possible combination of continuous parameter values for each possible combination of discrete parameter values. The information representing the allowable range in the discrete space is information that represents a transitionable region in the continuous value space and an allowable range of amount of change in the discrete space for each point that the discrete parameters can take in the discrete space.

Figure 14:
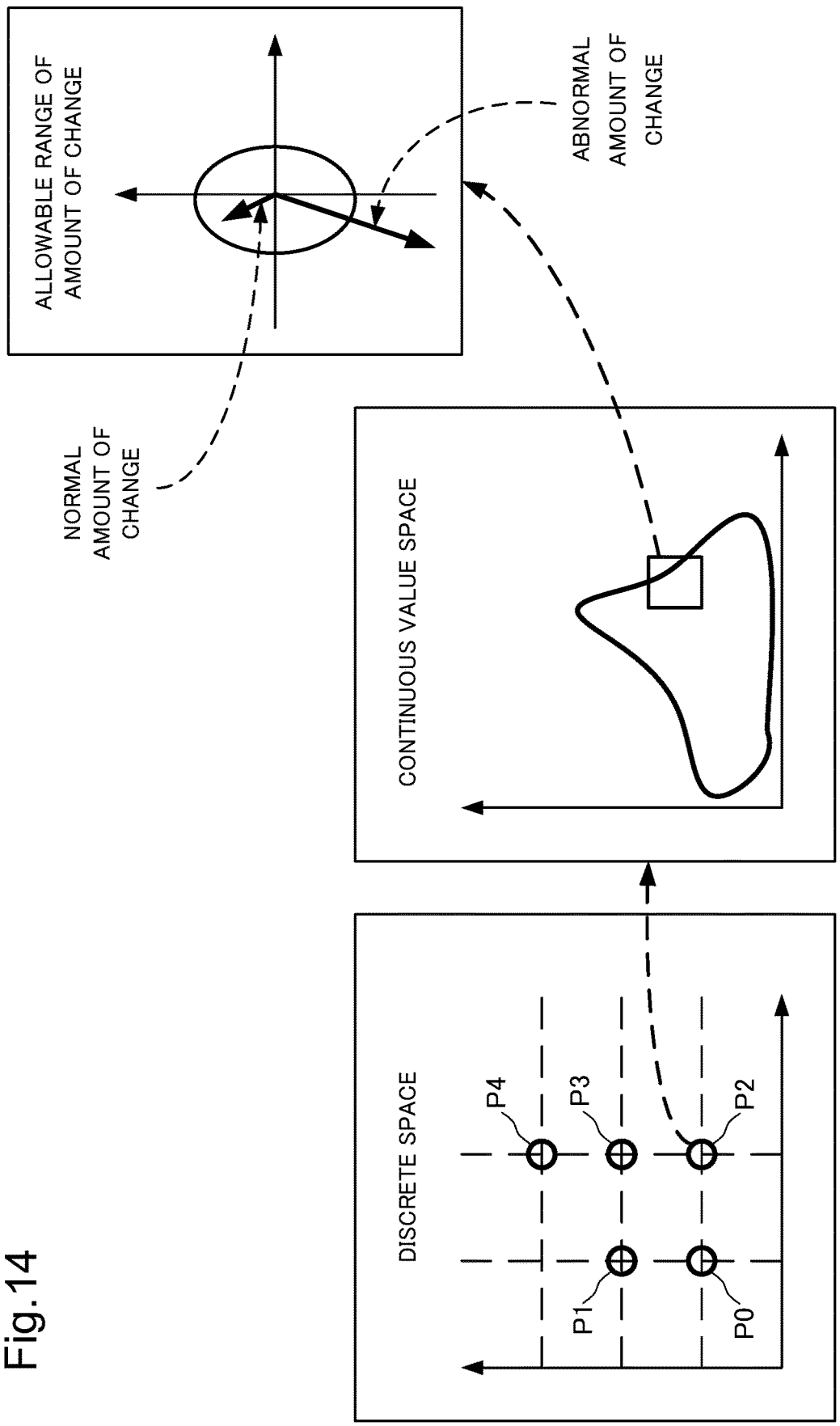
FIG. 14 is a diagram schematically illustrating an example of an allowable range of amount of change in continuous values based on a point in a discrete space and a point in a continuous value space.

FIG. 14 is a diagram schematically illustrating an example of an allowable range of amount of change in continuous values based on a point in a discrete space and a point in a continuous value space. In a rectangle representing the discrete space in FIG. 14, among intersections of broken lines, intersections each surrounded by a circle (for example, from point P0 to point P4) represent a distribution of discrete parameter values. In other words, the intersections each surrounded by a circle represent positions where a point can exist in a case where a combination of discrete parameter values is represented by a point in the discrete space.

FIG. 14 further illustrates, in a rectangle representing the continuous value space, a distribution of continuous parameter values in a case where the discrete parameter values are represented by coordinates of point P2. A closed curve in the rectangle representing the continuous value space represents a distribution of continuous parameter values in a case where a combination of discrete parameter values is represented by point P2. Similarly, for each combination of discrete parameter values (i.e., each of the points representing combinations of discrete parameter values in the discrete space), a distribution of points represented by combinations of continuous parameter values in the continuous value space is obtained.

FIG. 14 further illustrates an allowable range of amount of change in the continuous parameter values in a case where a rectangle shown in the continuous value space includes a point representing a combination of continuous parameter values. A region surrounded by an ellipse included in a rectangle of "allowable range of amount of change" drawn in FIG. 14 represents the allowable range of amount of change in the continuous parameter values. In the example in FIG. 14, vectors are drawn from an origin of a coordinate system whose coordinate axes are drawn in the rectangle of "allowable range of amount of change". These vectors represent combinations of changes in the continuous parameter values. In the example in FIG. 14, in a case where an end-point of a vector that is drawn is included in the ellipse drawn in the rectangle of "allowable range of amount of change", the amount of change in the continuous parameter values is included in the allowable range. The amount of change in the continuous parameter values represented by such a vector is assumed to be normal. In a case where an end-point of a vector that is drawn is not included in the ellipse drawn in the rectangle of "allowable range of amount of change", the amount of change in the continuous parameter values is not included in the allowable range. The amount of change in the continuous parameter values represented by such a vector is assumed to be abnormal.

Figure 15:
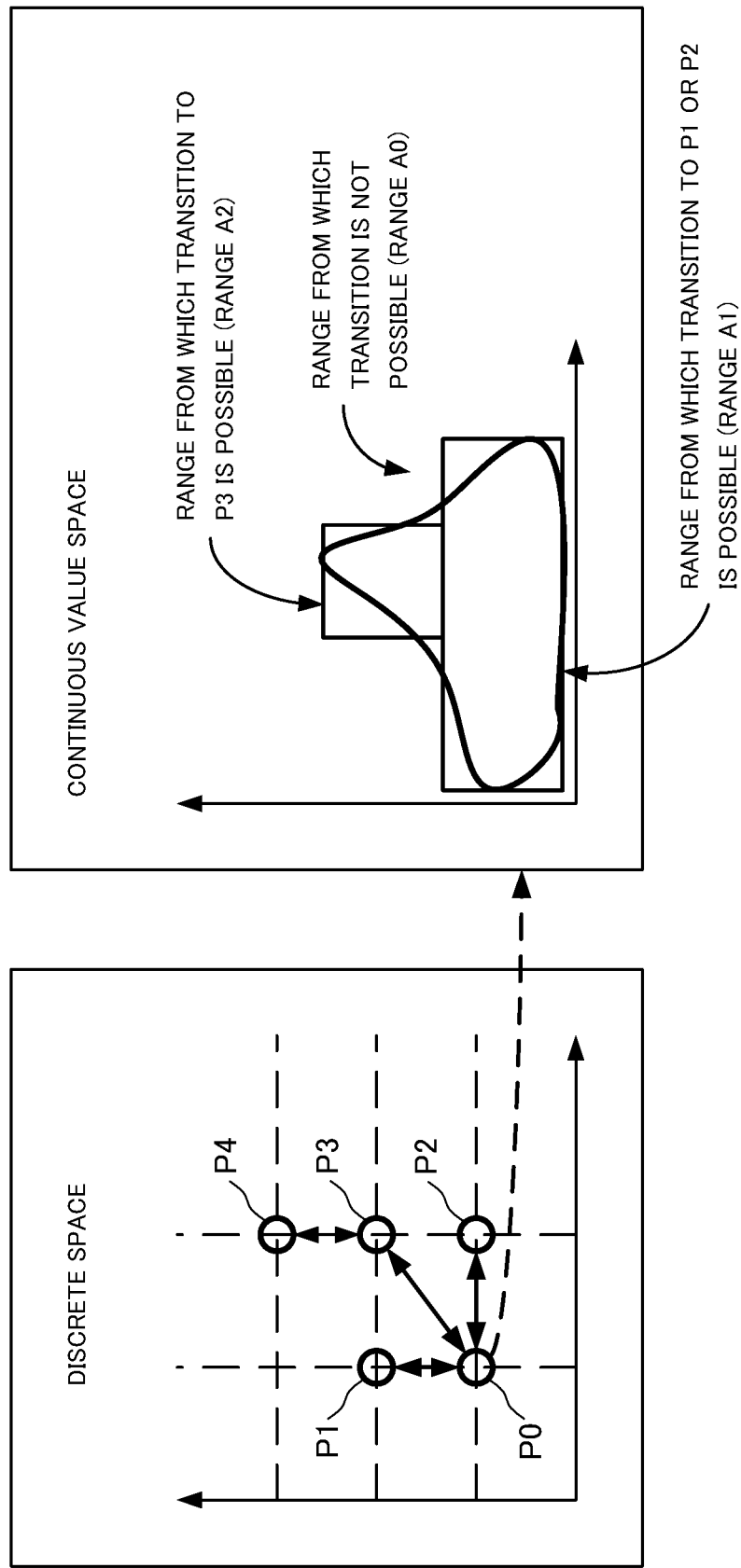
FIG. 15 is a diagram schematically illustrating an example of an allowable range of amount of change in discrete values based on a point in a discrete space and a point in a continuous value space.

FIG. 15 is a diagram schematically illustrating an example of an allowable range of amount of change in discrete values based on a point in a discrete space and a point in a continuous value space. The discrete space in FIG. 15 is the same as the discrete space drawn in FIG. 14. Circles drawn in a rectangle of the discrete space in FIG. 15 represent combinations of discrete parameter values, similarly to the circles in FIG. 14. A combination of discrete parameter values represents one of states of the discrete parameters. An arrow connecting two circles drawn in the rectangle of the discrete space in FIG. 15 indicates that a change in the direction of the arrow can occur between two combinations of discrete parameter values (i.e., two states), represented by two intersections included in the two circles. A double-headed arrow indicates that a change can occur in two directions represented by the arrow. The example illustrated in FIG. 15 indicates that, for example, in a case of a state represented by point P0, a change to a state represented by point P1, a change to a state represented by point P2, and a change to a state represented by point P3 can occur.

A closed curve included in the rectangle representing the continuous value space in FIG. 15 represents a distribution of points representing combinations of continuous parameter values in the continuous value space (also referred to as a distribution of combinations of continuous parameter values), similarly to the closed curve in FIG. 14. In the example illustrated in FIG. 15, the closed curve drawn in the rectangle indicating the continuous value space represents a distribution of continuous parameter values in a case where a combination of discrete parameter values is represented by point P0. A rectangle drawn so as to overlap a region surrounded by the closed curve represents the transitionable range described above.

In FIG. 15, range A1 is illustrated as a "range from which transition to P1 or P2 is possible". Range A2 is illustrated as a "range from which transition to P3 is possible". Furthermore, range A0 is illustrated as a "range from which transition is not possible". Range A0 is a range of the entire continuous value space excluding range A1 and range A2. In the example illustrated in FIG. 15, in a case where coordinates of point P0 in the discrete space represent discrete parameter values and coordinates of a point included in range A1 in the continuous value space represent continuous parameter values, the discrete parameter values change into values represented by coordinates of point P1 or values represented by coordinates of point P2. In this case, an allowable range of amount of change in the discrete parameter values is a value represented by a change in coordinates from point P0 to point P1 and a value represented by a change in coordinates from point P0 to point P2. In a case where the coordinates of point P0 in the discrete space represent discrete parameter values and coordinates of a point included in range A2 in the continuous value space represent continuous parameter values, the discrete parameter values change into values represented by coordinates of point P3. In this case, an allowable range of amount of change in the discrete parameter values is a value represented by a change in coordinates from point P0 to point P2. In a case where the coordinates of point P0 in the discrete space represent discrete parameter values, and coordinates of a point not included in either range A1 or range A2 in the continuous value space represent continuous parameter values, the discrete parameter values do not change from the values represented by the coordinates of point P0 in the discrete space. In this case, an allowable range of amount of change in the discrete parameter values is a point represented by a zero vector.

In the detection phase, the determination unit 170 similarly receives, from the calculation unit 120, the previous state (specifically, information representing the previous state) and a calculated change in the state of the vehicle (specifically, information representing a calculated amount of change in the state of the vehicle). The determination unit 170 identifies an allowable range determined in a feature space obtained from a combination of parameters that includes a parameter whose amount of change in value is contained in the received information representing the amount of change in the state of the vehicle. In a case where a plurality of feature spaces is obtained and a plurality of allowable ranges can be identified in allowable ranges stored in the rule storage unit 160, the determination unit 170 may identify all of the plurality of allowable ranges.

Specifically, the determination unit 170 of the present example embodiment may determine whether a change in the continuous parameter values among changes in the state of the vehicle is included in an allowable range in the continuous value space on the basis of information representing the allowable range in the continuous value space in information representing the allowable range. The determination unit 170 may further determine whether a change in the discrete parameter values among the changes in the state of the vehicle is included in an allowable range in the discrete space on the basis of information representing the allowable range in the discrete space in the information representing the allowable range. The order of determination may be reversed.

To be more specific, the determination unit 170 first identifies a point in the discrete space indicated by a combination of discrete parameter values among parameters representing the state of the vehicle. In a case where the identified point is not one of the points that the combination of discrete parameter values can take, the determination unit 170 may determine that a data frame acquired by the acquisition unit 110 is an anomaly data frame.

In a case where the identified point is one of the points that the combination of discrete parameter values can take, then the determination unit 170 determines whether a combination of continuous parameter values is included in an allowable range. That is, the determination unit 170 may determine whether a combination of continuous parameter values among the parameters representing the state of the vehicle is included in the allowable range of amount of change from the combination of continuous parameter values for the point identified in the discrete space. In a case where the combination of continuous parameter values is not included in the allowable range, the determination unit 170 may determine that the data frame acquired by the acquisition unit 110 is an anomaly data frame.

In a case where the combination of continuous parameter values is included in the allowable range, then the determination unit 170 identifies a transitionable region in the continuous value space. That is, the determination unit 170 identifies a transitionable region that includes the combination of continuous parameter values among the parameters representing the state of the vehicle, among transitionable regions in the continuous value space for the point identified in the discrete space. In a case where there is no transitionable region that includes the combination of continuous parameter values among the parameters representing the state of the vehicle, the determination unit 170 may determine that the data frame acquired by the acquisition unit 110 is an anomaly data frame.

In a case where a transitionable region that includes the combination of continuous parameter values among the parameters representing the state of the vehicle is identified, then the determination unit 170 determines whether the combination of discrete parameter values is included in the allowable range. That is, the determination unit 170 determines whether an amount of change in discrete parameters is included in an allowable range in the discrete space associated with the identified transitionable region. In a case where the amount of change in discrete parameters is not included in the allowable range in the discrete space associated with the identified transitionable region, the determination unit 170 may determine that the data frame acquired by the acquisition unit 110 is an anomaly data frame.

In a case where the amount of change in discrete parameters is included in the allowable range in the discrete space associated with the identified transitionable region, the determination unit 170 may determine that the data frame acquired by the acquisition unit 110 is not an anomaly data frame.

For example, in a case where the coordinates of point P2 in FIG. 14 represent the discrete parameter values and a point included in the rectangle drawn in the continuous value space in FIG. 14 represent the continuous parameter values, the allowable range of amount of change in the continuous parameter values is inside the ellipse illustrated in FIG. 14. In this case, in a case where the end-point of the vector representing the amount of change in the continuous parameter values is included in the range of the ellipse, the determination unit 170 may determine that the data frame is not an anomaly data frame. In a case where the end-point of the vector representing the amount of change in the continuous parameter values is not included in the range of the ellipse, the determination unit 170 may determine that the data frame is an anomaly data frame.

For example, in a case where the coordinates of point P0 in FIG. 15 represent the discrete parameter values, and a point included in range A1 drawn in the continuous value space in FIG. 15 represent the continuous parameter values, the allowable range of amount of change in the discrete parameter values is represented by a change in coordinates from P0 to P1 and a change in coordinates from P0 to P2. In this case, the determination unit 170 may determine that the data frame is not an anomaly data frame in a case where the amount of change in the discrete parameter values is either a value represented by the change in coordinates from P0 to P1 or a value represented by the change in coordinates from P0 to P2. Otherwise, the determination unit 170 may determine that the data frame is an anomaly data frame.

<<Operation>>

An operation of the surveillance device 100 according to the present example embodiment is the same as the operation of the surveillance device 100 according to the first example embodiment illustrated in FIGS. 3 and 4, except for the points described below.

In step S105 illustrated in FIG. 3, a distribution of change updated by the generation unit 130 is different from the distribution of change in the first example embodiment. As described above, the distribution of change in the present example embodiment includes, for each point in the discrete space, a distribution of change for each point in the continuous value space and a distribution of points, for each change from the point in the discrete space, before the change in the continuous value space.

In step S108 illustrated in FIG. 3, the setting unit of the present example embodiment sets, as allowable ranges of change, the allowable range in the continuous value space and the allowable range in the discrete space described above.

Figure 13:
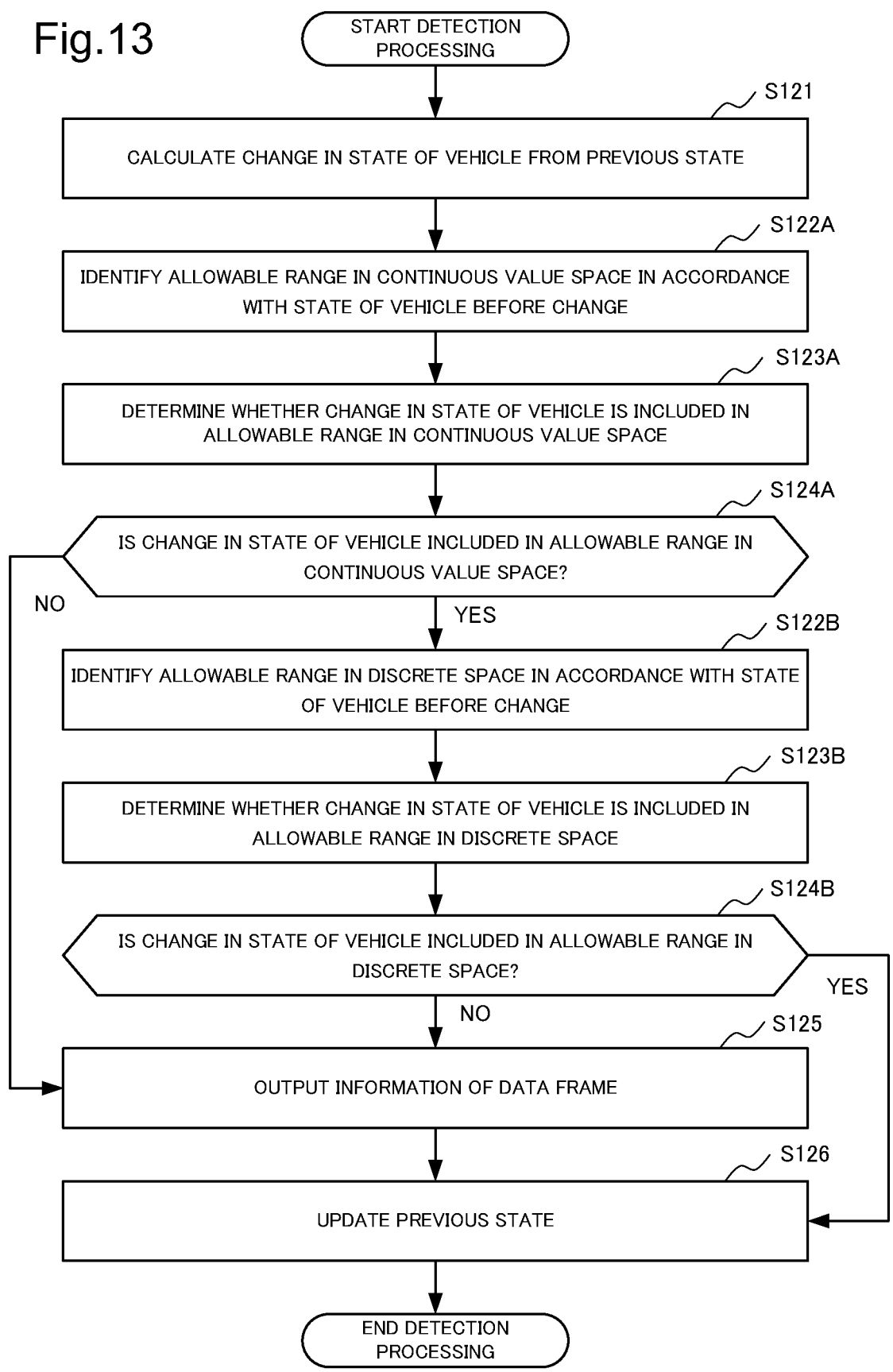
FIG. 13 is a second flowchart illustrating an example of an operation in a detection phase of the surveillance device according to the fourth example embodiment of the present invention.

FIG. 13 is a second flowchart illustrating an example of an operation in the detection phase of the surveillance device according to the fourth example embodiment of the present invention.

In detection processing in step S114 in FIG. 4, the surveillance device 100 of the present example embodiment performs the operation illustrated in FIG. 13.

In comparison between FIG. 5 and FIG. 13, the surveillance device 100 of the present example embodiment performs operations of step S122A to step S124A and operations of step S122B to step S124B instead of the operations of step S122 to step S124. Operations of other steps of the surveillance device 100 of the present example embodiment are the same as the operations of the steps assigned with the same numbers of the surveillance device 100 of the first example embodiment.

In step S122A, the determination unit 170 identifies an allowable range in the continuous value space in accordance with the state of the vehicle before the change. In the present example embodiment, the state of the vehicle before the change is represented by a combination of discrete parameter values and a combination of continuous parameter values before the change.

In step S122A, the determination unit 170 determines whether the change in the state of the vehicle is included in the allowable range in the continuous value space. In other words, the determination unit 170 determines whether the change in the continuous parameter values is included in the allowable range in the continuous value space.

If the state of the vehicle is not included in the allowable range in the continuous value space (NO in step S124A), then the surveillance device 100 performs an operation of step S125. If the state of the vehicle is included in the allowable range in the continuous value space (YES in step S124A), then the surveillance device 100 performs an operation of step S122B.

In step S122B, the determination unit 170 identifies an allowable range in the discrete space in accordance with the state of the vehicle before the change. In other words, the determination unit 170 identifies, among transitionable spaces in accordance with the combination of discrete parameter values before the change, a transitionable space that includes the continuous parameter values before the change. Then, the determination unit 170 identifies an allowable range in the discrete space associated with the identified transitionable space.

In step S123B, the determination unit 170 determines whether the change in the state of the vehicle is included in the allowable range in the discrete space. In other words, the determination unit 170 determines whether the change in the combination of discrete parameter values among the parameters representing the state of the vehicle is included in the allowable range in the discrete space.

If the change in the state of the vehicle is included in the allowable range in the discrete space (YES in step S124B), then the surveillance device 100 performs an operation of step S126. If the change in the state of the vehicle is not included in the allowable range in the discrete space (NO in step S124B), then the surveillance device 100 performs the operation of step S125.

The surveillance device 100 may perform the operations of step S122A to step S124A after the operations of step S122B to step S124B. In this case, if the change in the state of the vehicle is included in the allowable range in the discrete space (YES in step S124B), then the surveillance device 100 performs the operation of step S122A. If the change in the state of the vehicle is not included in the allowable range in the discrete space (NO in step S124B), then the surveillance device 100 performs the operation of step S125. If the state of the vehicle is not included in the allowable range in the continuous value space (NO in step S124A), then the surveillance device 100 performs the operation of step S125. If the state of the vehicle is included in the allowable range in the continuous value space (YES in step S124A), then the surveillance device 100 performs the operation of step S126.

<<Effect>>

The present example embodiment has the same effect as the first example embodiment. This is because of the same reason that the effect of the first example embodiment is produced.

<<First to Fifth Modifications>>

The present example embodiment can be modified in a similar manner to the first to fifth modifications of the first example embodiment.

<<Sixth Modification>>

In the present modification, the setting unit 150 may set only an allowable range in the continuous value space. In the present modification, allowable range information may include only an allowable range in the continuous value space. In the present modification, the determination unit 170 does not determine whether a change in the discrete parameter values among changes in the state of the vehicle is included in an allowable range in the discrete space. The determination unit 170 may determine whether a change in the continuous parameter values among the changes in the state of the vehicle is included in the allowable range in the continuous value space. If the change in the continuous parameter values among the changes in the state of the vehicle is included in the allowable range in the continuous value space, the determination unit 170 may determine that the data frame acquired by the acquisition unit 110 is not an anomaly data frame.

<<Seventh Modification>>

In the present modification, the setting unit 150 may set only an allowable range in the discrete space. In the present modification, allowable range information may include only an allowable range in the discrete space. In the present modification, the determination unit 170 does not determine whether a change in the continuous parameter values among the changes in the state of the vehicle is included in the allowable range in the continuous value space. The determination unit 170 may determine whether a change in the discrete parameter values among the changes in the state of the vehicle is included in an allowable range in the discrete space. If the change in the discrete parameter values among the changes in the state of the vehicle is included in the allowable range in the discrete space, the determination unit 170 may determine that the data frame acquired by the acquisition unit 110 is not an anomaly data frame.

In the fourth example embodiment and the first to sixth modifications of the fourth example embodiment, continuous parameters may also be referred to as first parameters. Discrete parameters may also be referred to as second parameters.

In the present modification, discrete parameters may also be referred to as first parameters. Continuous parameters may also be referred to as second parameters.

Other Example Embodiments

Each of the surveillance devices and the learning devices according to the example embodiments described above can be constituted by a computer including a memory into which a program read from a storage medium is loaded and a processor that executes the program. Each of the surveillance devices and the learning devices according to the example embodiments described above can also be constituted by dedicated hardware. Each of the surveillance devices and the learning devices according to the example embodiments described above can also be constituted by a combination of the above-described computer and dedicated hardware.

In other words, each of the surveillance devices and the learning devices according to the example embodiments described above can be constituted by hardware such as a circuitry. The circuitry may be, for example, a processor and a memory included in a computer. In this case, a program may be loaded into the memory. The program may be executed by the processor, and the computer may be operated as any one of the surveillance devices and the learning devices of the example embodiments described above. The circuitry may be, for example, a plurality of computers communicatively connected. The circuitry may be, for example, a circuit. The circuitry may be, for example, a plurality of circuits communicatively connected. The circuitry may be a combination of one or more computers and one or more circuits communicatively connected.

Figure 12:
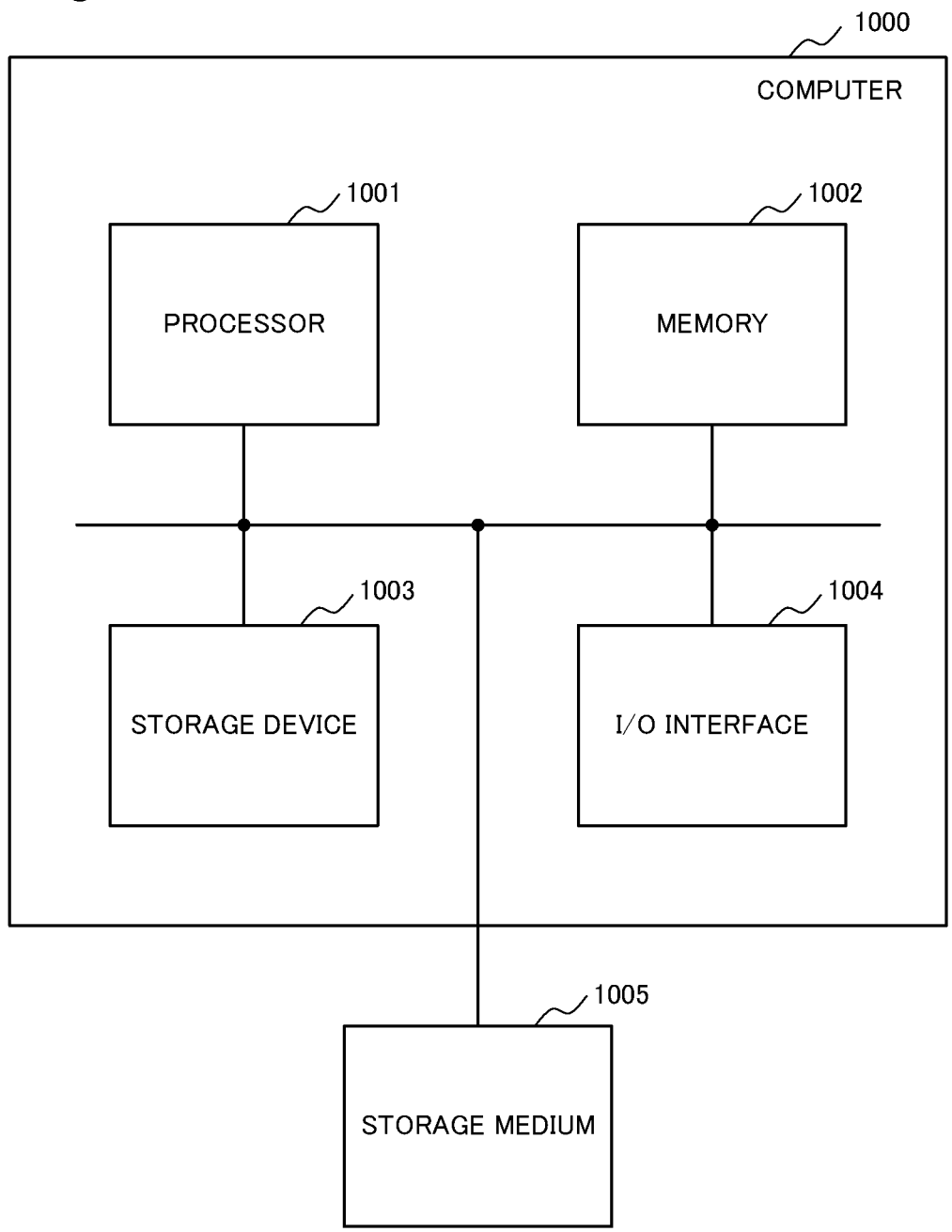
FIG. 12 is a diagram illustrating an example of a hardware configuration of a computer that can constitute each of the surveillance devices and the learning devices according to the example embodiments of the present invention.

FIG. 12 is a diagram illustrating an example of a hardware configuration of a computer 1000 that can constitute each of the surveillance devices and the learning devices according to the example embodiments described above. Referring to FIG. 12, the computer 1000 includes a processor 1001, a memory 1002, a storage device 1003, and an input/output (I/O) interface 1004. The computer 1000 can access a storage medium 1005. The memory 1002 and the storage device 1003 are, for example, storage devices such as random access memories (RAMs) or hard disks. The storage medium 1005 is, for example, a storage device such as a RAM or a hard disk, a read only memory (ROM), or a portable storage medium. The storage device 1003 may be the storage medium 1005. The processor 1001 can perform reading and writing of data and programs from and to the memory 1002 and the storage device 1003. The processor 1001 can access, for example, a bus 600 and a call center terminal 700 via the I/O interface 1004. The processor 1001 can access the storage medium 1005.

The storage medium 1005 stores a program for causing the computer 1000 to operate as the surveillance device according to any of the example embodiments described above. The processor 1001 loads the program stored in the storage medium 1005 into the memory 1002. Then, the processor 1001 executes the program loaded into the memory 1002 to cause the computer 1000 to operate as the surveillance device described above.

The storage medium 1005 stores a program for causing the computer 1000 to operate as the learning device according to any of the example embodiments described above. The processor 1001 loads the program stored in the storage medium 1005 into the memory 1002. Then, the processor 1001 executes the program loaded into the memory 1002 to cause the computer 1000 to operate as the learning device described above.

An acquisition unit 110, a calculation unit 120, a generation unit 130, a setting unit 150, a rule output unit 280, a rule acquisition unit 190, a determination unit 170, and an output unit 180 can be constituted by, for example, the processor 1001 that executes a dedicated program loaded into the memory 1002. A distribution storage unit 140 and a rule storage unit 160 can be constituted by the storage device 1003 such as the memory 1002 included in the computer 1000 or a hard disk device. Some or all of the acquisition unit 110, the calculation unit 120, the generation unit 130, the setting unit 150, the rule output unit 280, the rule acquisition unit 190, the determination unit 170, the output unit 180, the distribution storage unit 140, and the rule storage unit 160 can also be constituted by dedicated circuits for implementing functions of the corresponding units.

Supplementary Notes

Some or all of the above example embodiments may be described as the following Supplementary Notes, but are not limited to the following.

(Supplementary Note 1)
A surveillance device including:
a memory; and
at least one processor coupled to the memory,
the processor performing operations, the operations including:
calculating, based on a value of a parameter that is contained in a received data frame and represents a state of an apparatus, a change in the state of the apparatus; and
determining whether the change is included in an allowable range determined in accordance with the state of the apparatus before the change.

(Supplementary Note 2)
The surveillance device according to Supplementary Note 1, in which
the allowable range is determined in a feature space represented by a combination of the parameters, and
the operations further include:
determining whether the calculated change is included in the allowable range determined in the feature space represented by the combination including the parameters having values contained in the data frame.

(Supplementary Note 3)
The surveillance device according to Supplementary Note 2, in which the operations further include:
determining whether the change is included in each of the allowable ranges determined in the feature space represented by each of a plurality of the combinations each including at least one of the parameters having values contained in the data frame, the change being the change in the state of the apparatus represented by a change in values of the parameters included in the combination.

(Supplementary Note 4)
The surveillance device according to any one of Supplementary Notes 1 to 3, in which
the allowable range is determined as a first allowable range that is the allowable range of a first parameter among the parameters, and
the operations further include:
determining whether a change in the state of the apparatus represented by a change in value of the first parameter is included in the first allowable range determined in accordance with the values of the parameters.

(Supplementary Note 5)
The surveillance device according to Supplementary Note 4, in which
the first allowable range is determined for each combination of values of second parameters among the parameters in accordance with the value of the first parameter, and
the operations further include:
determining whether a change in the first parameter is included in the first allowable range determined in accordance with the value of the first parameter and the combination of values of the second parameters.

(Supplementary Note 6)
The surveillance device according to Supplementary Note 5, in which
the allowable range is determined as the first allowable range and a second allowable range that is the allowable range of the second parameters,
the second allowable range is determined for each region determined in a range of values of the first parameter,
the range of values of the first parameter is determined for each combination of values of the second parameters, and
the operations further include:
determining whether a change in the first parameter is included in the first allowable range determined in accordance with the combination of values of the second parameters, and whether a change in the second parameters is included in the second allowable range determined in accordance with the range in which the value of the first parameter is included.

(Supplementary Note 7)
The surveillance device according to Supplementary Note 4, in which
the first allowable range is determined for each region determined in a range of values of a second parameter among the parameters,
the range of values of the second parameter is determined for each combination of values of the first parameters, and
the operations further include:
determining whether a change in the first parameters is included in the first allowable range determined in accordance with the combination of values of the first parameters and the range in which the value of the second parameter is included.

(Supplementary Note 8)
The surveillance device according to any one of Supplementary Notes 1 to 7, in which the operations further include:
generating, based on the change, a distribution of the change in accordance with the state of the apparatus before the change; and
setting the allowable range based on the generated distribution.

(Supplementary Note 9)

The surveillance device according to any one of Supplementary Notes 1 to 8, in which the apparatus is a vehicle, and the data frame is output by an information processing device mounted on the vehicle to output information regarding a state of the vehicle, and indicates information regarding the vehicle.

(Supplementary Note 10)

A learning device including:

a memory; and at least one processor coupled to the memory, the processor performing operations, the operations including:

calculating, based on a value of a parameter that is contained in a received data frame and represents a state of an apparatus, a change in the state of the apparatus;

generating, based on the change, a distribution of the change in accordance with the state of the apparatus before the change; and setting an allowable range of the change based on the generated distribution.

(Supplementary Note 11)

The learning device according to Supplementary Note 10, in which the operations further include:

setting a first allowable range that is the allowable range of a first parameter among the parameters.

(Supplementary Note 12)

The learning device according to Supplementary Note 11, in which the operations further include:

setting the first allowable range of the change in value of the first parameter in accordance with the value of the first parameter for each combination of values of second parameters among the parameters.

(Supplementary Note 13)

The learning device according to Supplementary Note 12, in which the operations further include:

setting a range of values of the first parameter for each combination of values of second parameters among the parameters, and setting, in the set range, a plurality of regions and a second allowable range that is the allowable range of the change in values of the second parameters in a case where the value of the first parameter is included in each of the plurality of regions.

(Supplementary Note 14)

The learning device according to Supplementary Note 11, in which the operations further include:

setting a range of values of a second parameter among the parameters for each combination of values of the first parameters, and setting, in the set range, a plurality of regions and the first allowable range in a case where the value of the second parameter is included in each of the plurality of regions.

(Supplementary Note 15)

The learning device according to any one of Supplementary Notes 10 to 14, in which the apparatus is a vehicle, and the data frame is output by an information processing device mounted on the vehicle to output information regarding a state of the vehicle, and indicates information regarding the vehicle.

(Supplementary Note 16)

A surveillance method including:

calculating, based on a value of a parameter that is contained in a received data frame and represents a state of an apparatus, a change in the state of the apparatus; and determining whether the change is included in an allowable range determined in accordance with the state of the apparatus before the change.

(Supplementary Note 17)

The surveillance method according to Supplementary Note 16, in which the allowable range is determined in a feature space represented by a combination of the parameters, and the surveillance method further includes:

determining whether the calculated change is included in the allowable range determined in the feature space represented by the combination including the parameters having values contained in the data frame.

(Supplementary Note 18)

The surveillance method according to Supplementary Note 17, further including determining whether the change is included in each of the allowable ranges determined in the feature space represented by each of a plurality of the combinations each including at least one of the parameters having values contained in the data frame, the change being the change in the state of the apparatus represented by a change in values of the parameters included in the combination.

(Supplementary Note 19)

The surveillance method according to any one of Supplementary Notes 16 to 18, in which the allowable range is determined as a first allowable range that is the allowable range of a first parameter among the parameters, and the surveillance method further includes:

determining whether a change in the state of the apparatus represented by a change in value of the first parameter is included in the first allowable range determined in accordance with the values of the parameters.

(Supplementary Note 20)

The surveillance method according to Supplementary Note 19, in which the first allowable range is determined for each combination of values of second parameters among the parameters in accordance with the value of the first parameter, and the surveillance method further includes:

determining whether a change in the first parameter is included in the first allowable range determined in accordance with the value of the first parameter and the combination of values of the second parameters.

(Supplementary Note 21)

The surveillance method according to Supplementary Note 20, in which the allowable range is determined as the first allowable range and a second allowable range that is the allowable range of the second parameters, the second allowable range is determined for each region determined in a range of values of the first parameter, the range of values of the first parameter is determined for each combination of values of the second parameters, and the surveillance method further includes:

determining whether a change in the first parameter is included in the first allowable range determined in accordance with the combination of values of the second parameters, and whether a change in the second parameters is included in the second allowable range determined in accordance with the range in which the value of the first parameter is included.

(Supplementary Note 22)

The surveillance method according to Supplementary Note 19, in which
the first allowable range is determined for each region determined in a range of values of a second parameter among the parameters,
the range of values of the second parameter is determined for each combination of values of the first parameters, and
the surveillance method further includes:
determining whether a change in the first parameters is included in the first allowable range determined in accordance with the combination of values of the first parameters and the range in which the value of the second parameter is included.

(Supplementary Note 23)

The surveillance method according to any one of Supplementary Notes 16 to 22, further including:
generating, based on the change, a distribution of the change in accordance with the state of the apparatus before the change; and
setting the allowable range based on the generated distribution.

(Supplementary Note 24)

The surveillance method according to any one of Supplementary Notes 16 to 23, in which
the apparatus is a vehicle, and
the data frame is output by an information processing device mounted on the vehicle to output information regarding a state of the vehicle, and indicates information regarding the vehicle.

(Supplementary Note 25)

A learning method including:
calculating, based on a value of a parameters that is contained in a received data frame and represents a state of an apparatus, a change in the state of the apparatus;
generating, based on the change, a distribution of the change in accordance with the state of the apparatus before the change; and
setting an allowable range of the change based on the generated distribution.

(Supplementary Note 26)

The learning method according to Supplementary Note 25, further including:
setting a first allowable range that is the allowable range of a first parameter among the parameters.

(Supplementary Note 27)

The learning method according to Supplementary Note 26, further including
setting the first allowable range of the change in value of the first parameter in accordance with the value of the first parameter for each combination of values of second parameters among the parameters.

(Supplementary Note 28)

The learning method according to Supplementary Note 27, further including
setting a range of values of the first parameter for each combination of values of second parameters among the parameters, and setting, in the set range, a plurality of regions and a second allowable range that is the allowable range of the change in values of the second parameters in a case where the value of the first parameter is included in each of the plurality of regions.

(Supplementary Note 29)

The learning method according to Supplementary Note 26, further including:
setting a range of values of a second parameter among the parameters for each combination of values of the first parameters, and setting, in the set range, a plurality of regions and the first allowable range in a case where the value of the second parameter is included in each of the plurality of regions.

(Supplementary Note 30)

The learning method according to any one of Supplementary Notes 25 to 29, in which
the apparatus is a vehicle, and
the data frame is output by an information processing device mounted on the vehicle to output information regarding a state of the vehicle, and indicates information regarding the vehicle.

(Supplementary Note 31)

A non-transitory computer-readable storage medium that embodies a program that causes a computer to perform a method, the method including:
calculating, based on a value of a parameter that is contained in a received data frame and represents a state of an apparatus, a change in the state of the apparatus; and
determining whether the change is included in an allowable range determined in accordance with the state of the apparatus before the change.

(Supplementary Note 32)

The storage medium according to Supplementary Note 31, in which
the allowable range is determined in a feature space represented by a combination of the parameters, and
the method further includes:
determining whether the calculated change is included in the allowable range determined in the feature space represented by the combination including the parameters having values contained in the data frame.

(Supplementary Note 33)

The storage medium according to Supplementary Note 32, in which the method further includes:
determining whether the change is included in each of the allowable ranges determined in the feature space represented by each of a plurality of the combinations each including at least one of the parameters having values contained in the data frame, the change being the change in the state of the apparatus represented by a change in values of the parameters included in the combination.

(Supplementary Note 34)

The storage medium according to any one of Supplementary Notes 31 to 33, in which
the allowable range is determined as a first allowable range that is the allowable range of a first parameter among the parameters, and
the method further includes:
determining whether a change in the state of the apparatus represented by a change in value of the first parameter is included in the first allowable range determined in accordance with the values of the parameters.

(Supplementary Note 35)
The storage medium according to Supplementary Note 34, in which
the first allowable range is determined for each combination of values of second parameters among the parameters in accordance with the value of the first parameter, and
the method further includes:
determining whether a change in the first parameter is included in the first allowable range determined in accordance with the value of the first parameter and the combination of values of the second parameters.

(Supplementary Note 36)
The storage medium according to Supplementary Note 35, in which
the allowable range is determined as the first allowable range and a second allowable range that is the allowable range of the second parameters,
the second allowable range is determined for each region determined in a range of values of the first parameter,
the range of values of the first parameter is determined for each combination of values of the second parameters, and
the method further includes:
determining whether a change in the first parameter is included in the first allowable range determined in accordance with the combination of values of the second parameters, and whether a change in the second parameters is included in the second allowable range determined in accordance with the range in which the value of the first parameter is included.

(Supplementary Note 37)
The storage medium according to Supplementary Note 34, in which
the first allowable range is determined for each region determined in a range of values of a second parameter among the parameters,
the range of values of the second parameter is determined for each combination of values of the first parameters, and
the method further includes:
determining whether a change in the first parameters is included in the first allowable range determined in accordance with the combination of values of the first parameters and the range in which the value of the second parameter is included.

(Supplementary Note 38)
The storage medium according to any one of Supplementary Notes 31 to 37, in which the method further includes:
generating, based on the change, a distribution of the change in accordance with the state of the apparatus before the change; and
setting the allowable range based on the generated distribution.

(Supplementary Note 39)
The storage medium according to any one of Supplementary Notes 31 to 38, in which
the apparatus is a vehicle, and
the data frame is output by an information processing device mounted on the vehicle to output information regarding a state of the vehicle, and indicates information regarding the vehicle.

(Supplementary Note 40)
A non-transitory computer-readable storage medium that embodies a program that causes a computer to perform a method, the method including:
calculating, based on a value of a parameter that is contained in a received data frame and represent a state of an apparatus, a change in the state of the apparatus;
generating, based on the change, a distribution of the change in accordance with the state of the apparatus before the change; and
setting an allowable range of the change based on the generated distribution.

(Supplementary Note 41)
The storage medium according to Supplementary Note 40, in which the method further includes:
setting a first allowable range that is the allowable range of a first parameter among the parameters.

(Supplementary Note 42)
The storage medium according to Supplementary Note 41, in which the method further includes:
setting the first allowable range of the change in value of the first parameter in accordance with the value of the first parameter for each combination of values of second parameters among the parameters.

(Supplementary Note 43)
The storage medium according to Supplementary Note 42, in which the method further includes:
setting a range of values of the first parameter for each combination of values of second parameters among the parameters, and setting, in the set range, a plurality of regions and a second allowable range that is the allowable range of the change in values of the second parameters in a case where the value of the first parameter is included in each of the plurality of regions.

(Supplementary Note 44)
The storage medium according to Supplementary Note 41, in which the method further includes:
setting a range of values of a second parameter among the parameters for each combination of values of the first parameters, and setting, in the set range, a plurality of regions and the first allowable range in a case where the value of the second parameter is included in each of the plurality of regions.

(Supplementary Note 45)
The storage medium according to any one of Supplementary Notes 40 to 44, in which
the apparatus is a vehicle, and
the data frame is output by an information processing device mounted on the vehicle to output information regarding a state of the vehicle, and indicates information regarding the vehicle.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from international application No. PCT/JP2018/017735, filed on May 8, 2018, the disclosure of which is incorporated herein in its entirety by reference.

REFERENCE SIGNS LIST

1 on-board network
11 surveillance system
12 surveillance system
100 surveillance device
101 surveillance device
102 surveillance device 103 surveillance device
110 acquisition unit
120 calculation unit
130 generation unit
140 distribution storage unit
150 setting unit
160 rule storage unit
170 determination unit
180 output unit
190 rule acquisition unit
201 learning device
202 learning device
203 learning device
280 rule output unit
302 rule storage device
500 ECU
501 anomaly ECU
600 bus
700 call center terminal
1000 computer
1001 processor
1002 memory
1003 storage device
1004 I/O Interface
1005 storage medium

What is claimed is:

1. A surveillance device comprising:
a memory; and
at least one processor coupled to the memory,
the processor performing operations, the operations comprising:
receiving a plurality of data frames, each containing at least one parameter of a plurality of parameters, the plurality of parameters representing at least one state of an apparatus;
calculating, based on a value of each of the plurality of parameters a change in the state of the apparatus; and
determining whether the change is included in an allowable range determined in accordance with the state of the apparatus before the change and whether the change is included in the allowable range determined in a feature space represented by a combination of the plurality of parameters having values contained in the plurality of data frames.

2. The surveillance device according to claim 1, wherein the operations further comprise:
determining whether the change is included in each of the allowable ranges determined in the feature space represented by each of a plurality of the combinations each including at least one of the plurality of parameters having values contained in the data frame, the change being the change in the state of the apparatus represented by a change in values of the parameters included in the combination.

3. The surveillance device according to claim 1, wherein the allowable range is determined as a first allowable range that is the allowable range of a first parameter among the plurality of parameters, and
the operations further comprise:
determining whether a change in the state of the apparatus represented by a change in value of the first parameter is included in the first allowable range determined in accordance with the values of the plurality of parameters.

4. The surveillance device according to claim 3, wherein the first allowable range is determined, for each combination of values of second parameters among the plurality of parameters, in accordance with the value of the first parameter, and
the operations further comprise:
determining whether a change in the first parameter is included in the first allowable range determined in accordance with the value of the first parameter and the combination of values of the second parameters.

5. The surveillance device according to claim 4, wherein the allowable range is determined as the first allowable range and a second allowable range that is the allowable range of the second parameters,
the second allowable range is determined for each region determined in a range of values of the first parameter,
the range of values of the first parameter is determined for each combination of values of the second parameters, and
the operations further comprise:
determining whether a change in the first parameter is included in the first allowable range determined in accordance with the combination of values of the second parameters, and whether a change in the second parameters is included in the second allowable range determined in accordance with the range in which the value of the first parameter is included.

6. The surveillance device according to claim 3, wherein the first allowable range is determined for each region determined in a range of values of a second parameter among the parameters,
the range of values of the second parameter is determined for each combination of values of the first parameters, and
the operations further comprise:
determining whether a change in the first parameters is included in the first allowable range determined in accordance with the combination of values of the first parameters and the range in which the value of the second parameter is included.

7. The surveillance device according to claim 1, wherein the operations further comprise:
generating, based on the change, a distribution of the change in accordance with the state of the apparatus before the change; and
setting the allowable range based on the generated distribution.

8. The surveillance device according to claim 1, wherein the apparatus is a vehicle, and
the data frame is output by an information processing device mounted on the vehicle to output information regarding a state of the vehicle, and indicates information regarding the vehicle.

9. A learning device comprising:
a memory; and
at least one processor coupled to the memory,
the processor performing operations, the operations comprising:
calculating, based on a value of a parameter that is contained in a received data frame and represents a state of an apparatus, a change in the state of the apparatus;
generating, based on the change, a distribution of the change in accordance with the state of the apparatus before the change;
setting an allowable range of the change based on the generated distribution;

setting a first allowable range that is the allowable range of a first parameter among the parameters; and setting the first allowable range of the change in value of the first parameter in accordance with the value of the first parameter for each combination of values of second parameters among the parameters.

10. The learning device according to claim 9, wherein the operations further comprise:

setting a range of values of the first parameter for each combination of values of second parameters among the parameters, and setting, in the set range, a plurality of regions and a second allowable range that is the allowable range of the change in values of the second parameters in a case where the value of the first parameter is included in each of the plurality of regions.

11. The learning device according to claim 9, wherein the operations further comprise:

setting a range of values of a second parameter among the parameters for each combination of values of the first parameters, and setting, in the set range, a plurality of regions and the first allowable range in a case where the value of the second parameter is included in each of the plurality of regions.

12. The learning device according to claim 9, wherein the apparatus is a vehicle, and the data frame is output by an information processing device mounted on the vehicle to output information regarding a state of the vehicle, and indicates information regarding the vehicle.

13. A surveillance method comprising:

receiving a plurality of data frames, each containing at least one parameter of a plurality of parameters, the plurality of parameters representing at least one state of an apparatus;

calculating, based on a value of each of the plurality of parameters, a change in the state of the apparatus; and determining whether the change is included in an allowable range determined in accordance with the state of the apparatus before the change and whether the change is included in the allowable range determined in a feature space represented by a combination of the plurality of parameters having values contained in the plurality of data frames.

14. The surveillance method according to claim 13, further comprising:

determining whether the change is included in each of the allowable ranges determined in the feature space represented by each of a plurality of the combinations each including at least one of the plurality of parameters having values contained in the data frame, the change being the change in the state of the apparatus represented by a change in values of the parameters included in the combination.

15. The surveillance method according to claim 13, wherein the allowable range is determined as a first allowable range that is the allowable range of a first parameter among the plurality of parameters, and the surveillance method further comprises:

determining whether a change in the state of the apparatus represented by a change in value of the first parameter is included in the first allowable range determined in accordance with the values of the plurality of parameters.

16. The surveillance method according to claim 15, wherein the first allowable range is determined for each combination of values of second parameters among the plurality of parameters in accordance with the value of the first parameter, and the surveillance method further comprises:

determining whether a change in the first parameter is included in the first allowable range determined in accordance with the value of the first parameter and the combination of values of the second parameters.

17. The surveillance method according to claim 16, wherein the allowable range is determined as the first allowable range and a second allowable range that is the allowable range of the second parameters, the second allowable range is determined for each region determined in a range of values of the first parameter, the range of values of the first parameter is determined for each combination of values of the second parameters, and the surveillance method further comprises:

determining whether a change in the first parameter is included in the first allowable range determined in accordance with the combination of values of the second parameters, and whether a change in the second parameters is included in the second allowable range determined in accordance with the range in which the value of the first parameter is included.

18. The surveillance method according to claim 15, wherein the first allowable range is determined for each region determined in a range of values of a second parameter among the parameters, the range of values of the second parameter is determined for each combination of values of the first parameters, and the surveillance method further comprises:

determining whether a change in the first parameters is included in the first allowable range determined in accordance with the combination of values of the first parameters and the range in which the value of the second parameter is included.

19. The surveillance method according to claim 13, further comprising:

generating, based on the change, a distribution of the change in accordance with the state of the apparatus before the change; and setting the allowable range based on the generated distribution.

20. The surveillance method according to claim 13, wherein the apparatus is a vehicle, and the data frame is output by an information processing device mounted on the vehicle to output information regarding a state of the vehicle, and indicates information regarding the vehicle.

21. A non-transitory computer-readable storage medium embodying a program, the program causing a computer to perform a method, the method comprising:

receiving a plurality of data frames, each containing at least one parameter of a plurality of parameters, the plurality of parameters representing at least one state of an apparatus;

calculating, based on a value of each of the plurality of parameters, a change in the state of the apparatus; and determining whether the change is included in an allowable range determined in accordance with the state of the apparatus before the change and whether the change is included in the allowable range determined in a feature space represented by a combination of the plurality of parameters having values contained in the plurality of data frames.

\* \* \* \* \*